(12) United States Patent
Kim et al.

(10) Patent No.: US 10,873,926 B2
(45) Date of Patent: *Dec. 22, 2020

(54) METHOD FOR TRANSMITTING DATA TRANSMISSION RESOURCE ALLOCATION INFORMATION IN WIRELESS LAN SYSTEM, AND APPARATUS THEREFOR

(71) Applicant: LG ELECTRONICS INC., Seoul (KR)

(72) Inventors: Jeongki Kim, Seoul (KR); Wookbong Lee, Seoul (KR); Kiseon Ryu, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,445

(22) Filed: Jul. 11, 2019

(65) Prior Publication Data
US 2019/0335424 A1    Oct. 31, 2019

Related U.S. Application Data

(63) Continuation of application No. 15/516,007, filed as application No. PCT/KR2016/001024 on Jan. 29, 2019, now Pat. No. 10,383,093.

(Continued)

(51) Int. Cl.
*H04W 84/12* (2009.01)
*H04B 7/0413* (2017.01)
(Continued)

(52) U.S. Cl.
CPC .......... *H04W 72/04* (2013.01); *H04B 7/0413* (2013.01); *H04L 5/001* (2013.01);
(Continued)

(58) Field of Classification Search
CPC . H04W 72/04; H04W 72/042; H04W 72/044; H04W 72/0453; H04W 72/02;
(Continued)

(56) References Cited

U.S. PATENT DOCUMENTS

| 8,645,881 B1 | 2/2014 | Kriplani et al. |
| 2010/0103901 A1* | 4/2010 | Miki .................. H04W 88/08 370/330 |

(Continued)

OTHER PUBLICATIONS

European Patent Office Application Serial No. 167437433, Search Report dated Aug. 17, 2018, 11 pages.

(Continued)

*Primary Examiner* — Candal Elpenord
(74) *Attorney, Agent, or Firm* — Lee Hong Degerman Kang & Waimey

(57) ABSTRACT

The present document relates to a method for allocating resources for multi-user or multi-station (STA) data transmission in a wireless LAN system, and an apparatus therefor. To this end, an AP generates a frame including a signaling field and a data field, wherein the signaling field includes a first signaling field (SIG A field) comprising common control information for a plurality of STAs and a second signaling field (SIG B field) comprising user specific control information for each of the plurality of STAs, the second signaling field also comprising data transmission resource allocation information for each of the plurality of STAs. The AP transmits the thus generated frame to the plurality of STAs. If the frame is transmitted with a bandwidth of 40 MHz or greater, the second signaling field transmits independent control information in two adjacent 20 MHz bands, and the second signaling field, transmitted through a specific 20 MHz band, comprises data transmission resource allocation information within the specific 20 MHz band.

12 Claims, 24 Drawing Sheets

Related U.S. Application Data

(60) Provisional application No. 62/109,071, filed on Jan. 29, 2015, provisional application No. 62/115,584, filed on Feb. 12, 2015.

(51) Int. Cl.
*H04L 27/26* (2006.01)
*H04W 72/04* (2009.01)
*H04L 5/00* (2006.01)
*H04W 88/08* (2009.01)

(52) U.S. Cl.
CPC .......... *H04L 5/0007* (2013.01); *H04L 5/0037* (2013.01); *H04L 5/0044* (2013.01); *H04L 5/0094* (2013.01); *H04L 27/2602* (2013.01); *H04W 84/12* (2013.01); *H04L 5/0091* (2013.01); *H04L 5/0098* (2013.01); *H04W 88/08* (2013.01)

(58) Field of Classification Search
CPC ......... H04W 72/1284; H04W 72/1289; H04W 84/12; H04W 88/08; H04L 5/0037; H04L 5/0094; H04L 5/001; H04L 5/0044; H04L 5/0007; H04L 5/0091; H04L 5/0098; H04L 27/2602
See application file for complete search history.

(56) References Cited

U.S. PATENT DOCUMENTS

| | | |
|---|---|---|
| 2013/0286959 A1 | 10/2013 | Lou et al. |
| 2014/0023156 A1 | 1/2014 | Zhang et al. |
| 2014/0198877 A1 | 7/2014 | Van Nee |
| 2014/0211775 A1 | 7/2014 | Sampath et al. |
| 2014/0369276 A1 | 12/2014 | Porat et al. |
| 2015/0009894 A1 | 1/2015 | Vermani et al. |
| 2015/0063255 A1 | 3/2015 | Tandra et al. |
| 2015/0131517 A1* | 5/2015 | Chu ................... H04W 72/005 370/312 |
| 2015/0195112 A1 | 7/2015 | Jones, IV et al. |
| 2016/0156438 A1* | 6/2016 | Sun ................... H04W 72/044 370/330 |
| 2017/0201993 A1 | 7/2017 | Tomeba et al. |
| 2017/0295561 A1 | 10/2017 | Kim et al. |
| 2018/0198591 A1 | 7/2018 | Stacey et al. |

OTHER PUBLICATIONS

IEEE 802.11 Working Group: "IEEE P802.11a/D2.0 Draft Standard for Information Technology—Telecommunications and information exchange between systems—Local and metropolitan area networks—Specific requirements Part 11: Wireless LAN Medium Access Control (MAC) and Physical Layer (PHY) specifications Amendment 4", Jan. 2012, XP055377925, 360 pages.

Seok, Y. et al., "HEW PPDU Format for Supporting MIMO-OFDMA", doc.: IEEE 802.11-14/1210r1, Sep. 2014, XP068071035, 16 pages.

PCT International Application No. PCT/KR2016/001024, Notification of Transmittal of the International Search Report and the Written Opinion of the International Searching Authority, or Declaration dated Jun. 8, 2016, 9 pages.

Zhang, J. et al., "Preamble structure for 11ax system", Huawei Technologies, doc.: IEEE 802.11-15101011r1, Jan. 2015, 18 pages.

U.S. Appl. No. 15/516,007, Notice of Allowance dated Mar. 27, 2019, 11 pages.

U.S. Appl. No. 15/516,007, Final Office Action dated Dec. 4, 2018, 20 pages.

U.S. Appl. No. 15/516,007, Office Action dated Jun. 14, 2018, 17 pages.

\* cited by examiner

FIG. 13

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | BW | Reserved | STBC | Group ID | NSTS/Partial AID | | | | TXOP_PS_NOT_ALLOWED | Reserved |
| SU Name: | | | | | SU NSTS | Partial AID | | | | |
| MU Name: | | | | | MU[0] NSTS | MU[1] NSTS | MU[2] NSTS | MU[3] NSTS | | |
| Bits: | 2 | 1 | 1 | 6 | 3 | 3 | 3 | 3 | 1 | 1 |

(a)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | SU VHT-MCS/MU[1-3] Coding | | | | Beam-formed | Reserved | CRC | Tail |
| SU Name: | | | | | SU VHT-MCS | | | | Beam-formed | | | |
| MU Name: | | | | | MU[1] Coding | MU[2] Coding | MU[3] Coding | Reserved | Reserved | | | |
| Bits: | 1 | 1 | 1 | 1 | 1 | 1 | 1 | 1 | 1 | 1 | 8 | 6 |

| Octets: 2 | 2 | 6 | 6 | 6 | 2 | 6 | 2 | 4 | 0-11426 | 4 |
|---|---|---|---|---|---|---|---|---|---|---|
| Frame Control | Duration /ID | Address 1 | Address 2 | Address 3 | Sequence Control | Address 4 | QoS Control | HT Control | Frame Body | FCS |

← MAC header →

FIG. 15

| B1 B15 | B16 B17 | B18 B19 | B20 B21 | B22 B23 | B24 | B25 B29 | B30 | B31 |
|---|---|---|---|---|---|---|---|---|
| VHT =0 | Link Adaptation Control | Calibration Position | Calibration Sequence | Reserved | CSI/St eering | NDP Announ cement | Reserved | AC Constraint | RDG/ More PPDU |
| Bits: 1 | 15 | 2 | 2 | 2 | 2 | 1 | 5 | 1 | 1 |

(a)

| B1 | B2 B5 | B6 B8 | B9 B15 |
|---|---|---|---|
| TRQ | MAI | MFSI | MFB/ASELC |
| 1 | 4 | 3 | 7 |

| | B1 | B2 | B3<br>B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/<br>GID-L | MFB | GID-H | Coding<br>Type | FB Tx<br>Type | Unsoli<br>cited<br>MFB | AC<br>Constraint | RDG/<br>More<br>PPD<br>U |
| Bits: | 1 | 1 | 1 | 3 | 3 | 15 | 3 | 1 | 1 | 1 | 1 | 1 |

(a)

| B9<br>B11 | B12<br>B15 | B16<br>B17 | B16<br>B23 |
|---|---|---|---|
| VHT<br>N_STS | MCS | BW | SNR |
| 3 | 4 | 2 | 6 |

| | Frame<br>Control | A1 | A2 | Sequence<br>Control | A3 | A4 | Frame Body | FCS |
|---|---|---|---|---|---|---|---|---|
| Octets: | 2 | 2 or 6 | 6 or 2 | 0 or 2 | 0 or 6 | 0 or 6 | variable | 4 |

(a)

| | B0 B1 | B2 B4 | B5 B7 | B8 | B9 | B10 | B11 | B12 | B13 | B14 | B15 |
|---|---|---|---|---|---|---|---|---|---|---|---|
| | Protocol<br>Version | Type | PTID/<br>Subtype | From<br>DS | More<br>Fragm<br>ents | Power<br>Manage<br>ments | More<br>Data | Protected<br>Frame | End of<br>Service<br>Period | Relayed<br>Frame | Ack<br>Policy |
| Bits: | 2 | 3 | 3 | 1 | 1 | 1 | 1 | 1 | 1 | 1 | 1 |

(b)

FIG. 24
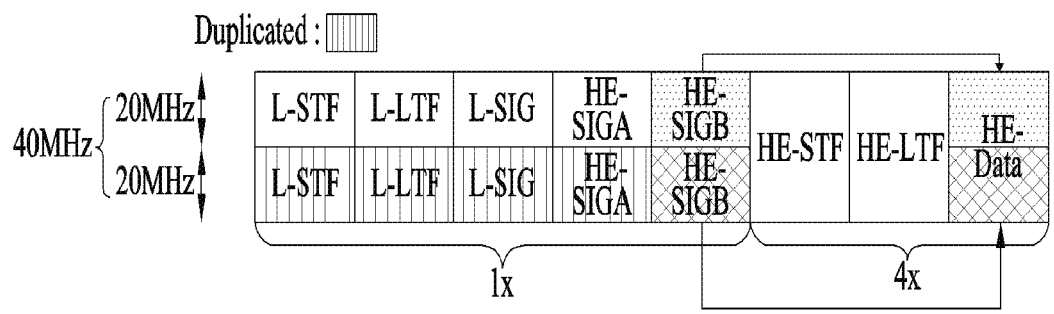
FIG. 25
40 MHz
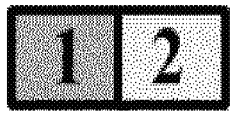
80 MHz
160 MHz
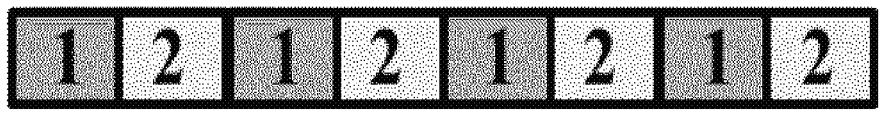

METHOD FOR TRANSMITTING DATA TRANSMISSION RESOURCE ALLOCATION INFORMATION IN WIRELESS LAN SYSTEM, AND APPARATUS THEREFOR

CROSS-REFERENCE TO RELATED APPLICATIONS

This application is a continuation of U.S. patent application Ser. No. 15/516,007, filed on Mar. 30, 2017, which is the National Stage filing under 35 U.S.C. 371 of International Application No. PCT/KR2016/001024, filed on Jan. 29, 2016, which claims the benefit of U.S. Provisional Application No. 62/109,071, filed on Jan. 29, 2015, and 62/115,584, filed on Feb. 12, 2015, the contents of which are all hereby incorporated by reference herein in their entirety.

TECHNICAL FIELD

The following description relates to a resource allocation method for data transmission of multiple users or multiple stations (STAs) in a wireless local area network (LAN) and an apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

DISCLOSURE

Technical Problem

In IEEE 802.11ax, an OFDMA transmission scheme and a multi-user transmission scheme will be used. Therefore, there is a need for a method of efficiently allocating resources upon transmitting frames to several users or upon receiving frames from several users at one point of time.

In addition, in IEEE 802.11ax, since wideband transmission of 40 MHz, 80 MHz and 160 MHz is possible in addition to a basic channel of 20 MHz, there is a need for technology capable of minimizing overhead while flexibly allocating resources to users in wideband frame transmission/reception.

Technical Solution

The object of the present invention can be achieved by providing a method of, at an access point (AP), transmitting a radio frame to a plurality of stations (STAs) in a wireless local area network (WLAN) system including: generating, at the AP, a frame including a signaling field and a data field, the signaling field including a first signaling field (SIG A field) including common control information of the plurality of STAs and a second signaling field (SIG B field) including user specific control information of each of the plurality of STAs and the second signaling field including data transmission resource allocation information of each of the plurality of STAs; and transmitting, by the AP, the generated frame to the plurality of STAs, wherein, if the frame is transmitted with a bandwidth of 40 MHz or more, first one of the data transmission resource allocation information transmitted through a first 20 MHz band is independent from second one of the data transmission resource allocation information transmitted through a second 20 MHz band, the first 20 MHz band and the second 20 MHz band are two contiguous 20 MHz bands, and wherein the second signaling field transmitted through a specific 20-MHz band includes data transmission resource allocation information for data transmitted through the specific 20-MHz band.

The second signaling field transmitted through the specific 20-MHz band may further include data transmission resource allocation information in another 20-MHz band which is non-contiguous to the specific 20 MHz band, if the frame is transmitted with the bandwidth of 40 MHz or more.

The data transmission allocation information of the second signaling field transmitted through the specific 20-MHz band may be duplicated and transmitted through the non-contiguous 20-MHz band.

The data transmission resource allocation information of the second signaling field transmitted through the specific 20-MHz band may indicate that a plurality of non-contiguous 20-MHz bands are allocated to a specific STA among the plurality of STAs.

The second signaling field may include first information indicating a common resource allocation structure for the plurality of STAs and second information indicating resource allocation information of each of the plurality of STAs.

The second information may include a field indicating an identity of each of the plurality of STAs and at least one per-STA resource allocation field indicating data transmission resource allocation information of an STA corresponding to the identity in the resource allocation structure.

The first information may be in the form of a bitmap having a predetermined length, and a plurality of combinations expressible by the bitmap may comprise a first resource unit combination having a size of a multiple of 26 tones and a second resource unit combination having a size of a multiple of 242 tones in the resource allocation structure.

In another aspect of the present invention, provided herein is an access point (AP) apparatus for transmitting a radio frame to a plurality of stations (STAs) in a wireless local area network (WLAN) system including a processor configured to generate a frame including a signaling field and a data field, the signaling field including a first signaling field (SIG A field) including common control information of the plurality of STAs and a second signaling field (SIG B field) including user specific control information of each of the plurality of STAs and the second signaling field including data transmission resource allocation information of each of the plurality of STAs and a transceiver configured to transmit the frame generated by the processor to the plurality of STAs, wherein, if the frame is transmitted with a bandwidth of 40 MHz or more, the processor configures first one of the data transmission resource allocation information transmitted through a first 20 MHz band independently from second one of the data transmission resource allocation information transmitted through a second 20 MHz band, the first 20 MHz band and the second 20 MHz band are two contiguous 20 MHz bands, and wherein the processor further configures the second signaling field transmitted through a specific 20-MHz band to include data transmission resource allocation information in the specific 20-MHz band.

The processor may further configure the second signaling field transmitted through the specific 20-MHz band to further include data transmission resource allocation information in another non-contiguous 20-MHz band, if the frame is transmitted with the bandwidth of 40 MHz or more.

The data transmission allocation information of the second signaling field transmitted through the specific 20-MHz band may be duplicated and transmitted through the non-contiguous 20-MHz band.

The processor may configure the data transmission resource allocation information of the second signaling field transmitted through the specific 20-MHz band to indicate that a plurality of non-contiguous 20-MHz bands are allocated a specific STA among the plurality of STAs.

The second signaling field may include first information indicating a common resource allocation structure for the plurality of STAs and second information indicating resource allocation information of each of the plurality of STAs.

The second information may include a field indicating an identity of each of the plurality of STAs and at least one per-STA resource allocation field indicating data transmission resource allocation information of an STA corresponding to the identity in the resource allocation structure.

The first information may be in the form of a bitmap having a predetermined length, and a plurality of combinations expressible by the bitmap may comprise a first resource unit combination having a size of a multiple of 26 tones and a second resource unit combination having a size of a multiple of 242 tones in the resource allocation structure.

Advantageous Effects

According to the present invention, it is possible to efficiently and flexibly transmit data transmission resources to users in wideband multi-user transmission.

DESCRIPTION OF DRAWINGS

FIGS. 9 to 13 are diagrams illustrating an example of a frame structure used in an IEEE 802.11 system.

FIGS. 14 to 16 are diagrams showing a MAC frame format.

FIG. 17 is a diagram showing a short MAC frame format.

FIGS. 23 to 25 are diagrams illustrating a method of transmitting HE-SIG B according to various embodiments of the present invention.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method of efficiently using a channel having a wide band in a WLAN system and an apparatus therefor. To this end, a WLAN system, to which the present invention is applied, will be described in detail.

Figure 1:
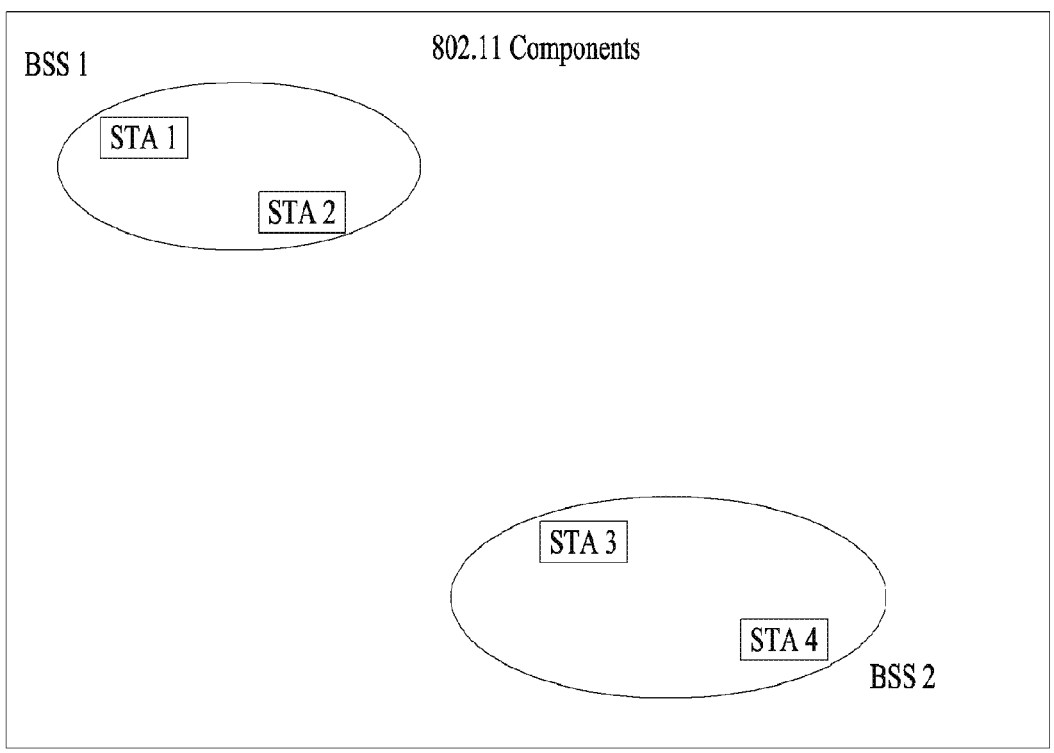
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/

Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
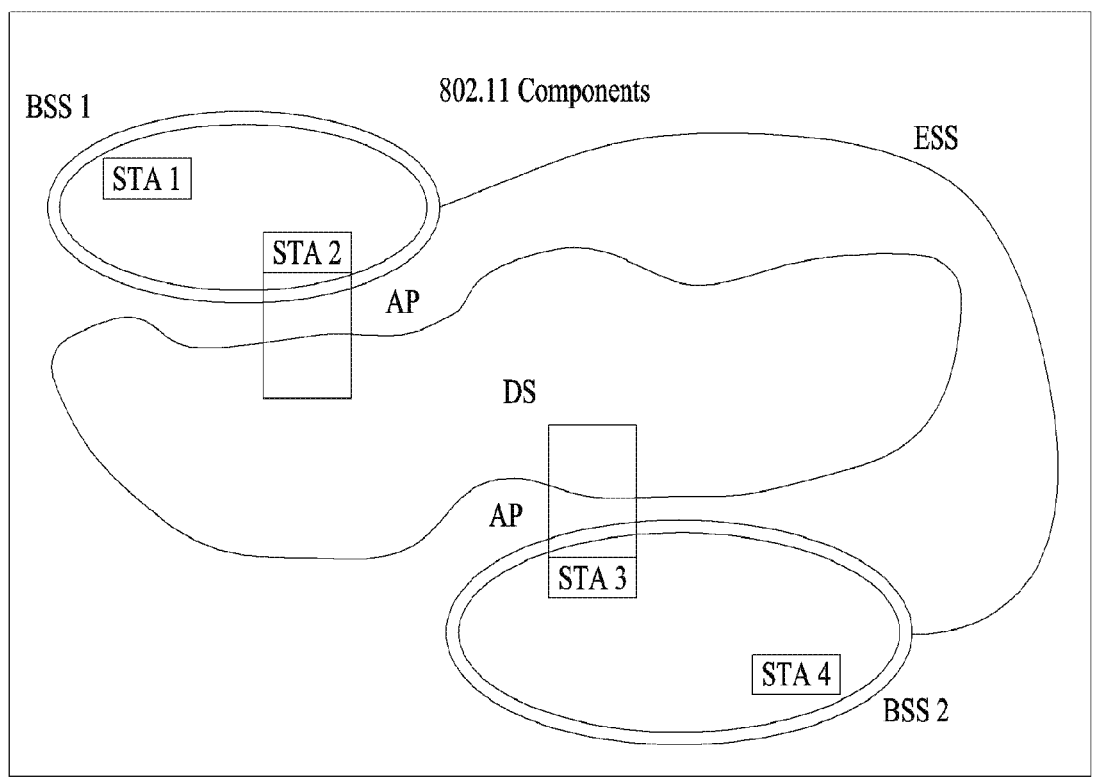
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
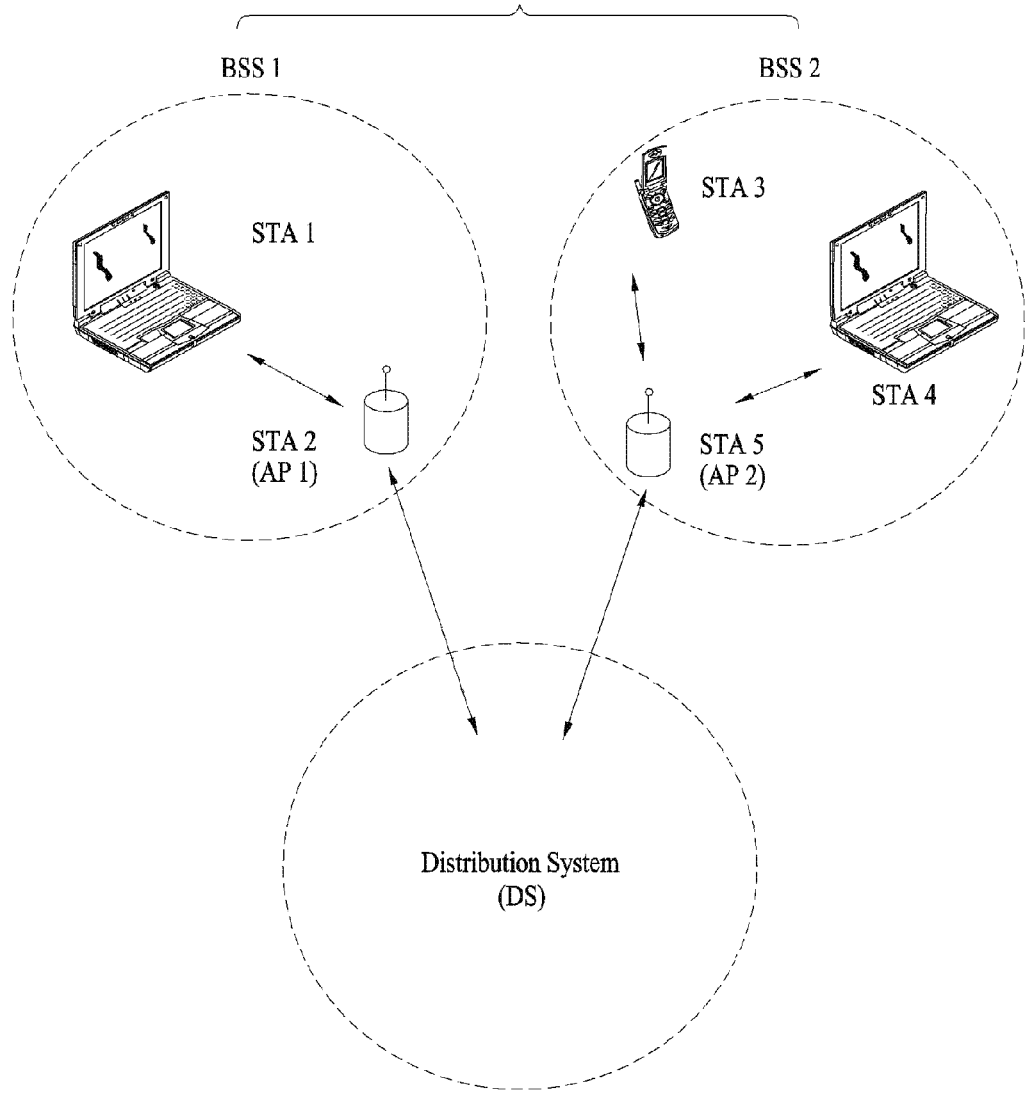
FIG. 3 is a diagram illustrating a block Ack mechanism used in a WLAN system.

FIG. 3 is a diagram illustrating an exemplary structure of a WLAN system. FIG. 3 shows an example of an infrastructure BSS including a DS.

In the example of FIG. 3, BSS1 and BSS2 configure an ESS. In the WLAN system, a station operates according to MAC/PHY rules of IEEE 802.11. The station includes an AP station and a non-AP station. The non-AP station corresponds to an apparatus directly handled by a user, such as a laptop or a mobile telephone. In the example of FIG. 3, a station 1, a station 3 and a station 4 are non-AP stations and a station 2 and a station 5 are AP stations.

In the following description, the non-AP station may be referred to as a terminal, a wireless transmit/receive unit (WTRU), a user equipment (UE), a mobile station (MS), a mobile terminal, a mobile subscriber station (MSS), etc. In addition, the AP corresponds to a base station (BS), a node-B, an evolved node-B (eNB), a base transceiver system (BTS), a femto BS, etc. in different wireless communication fields.

Figure 4:
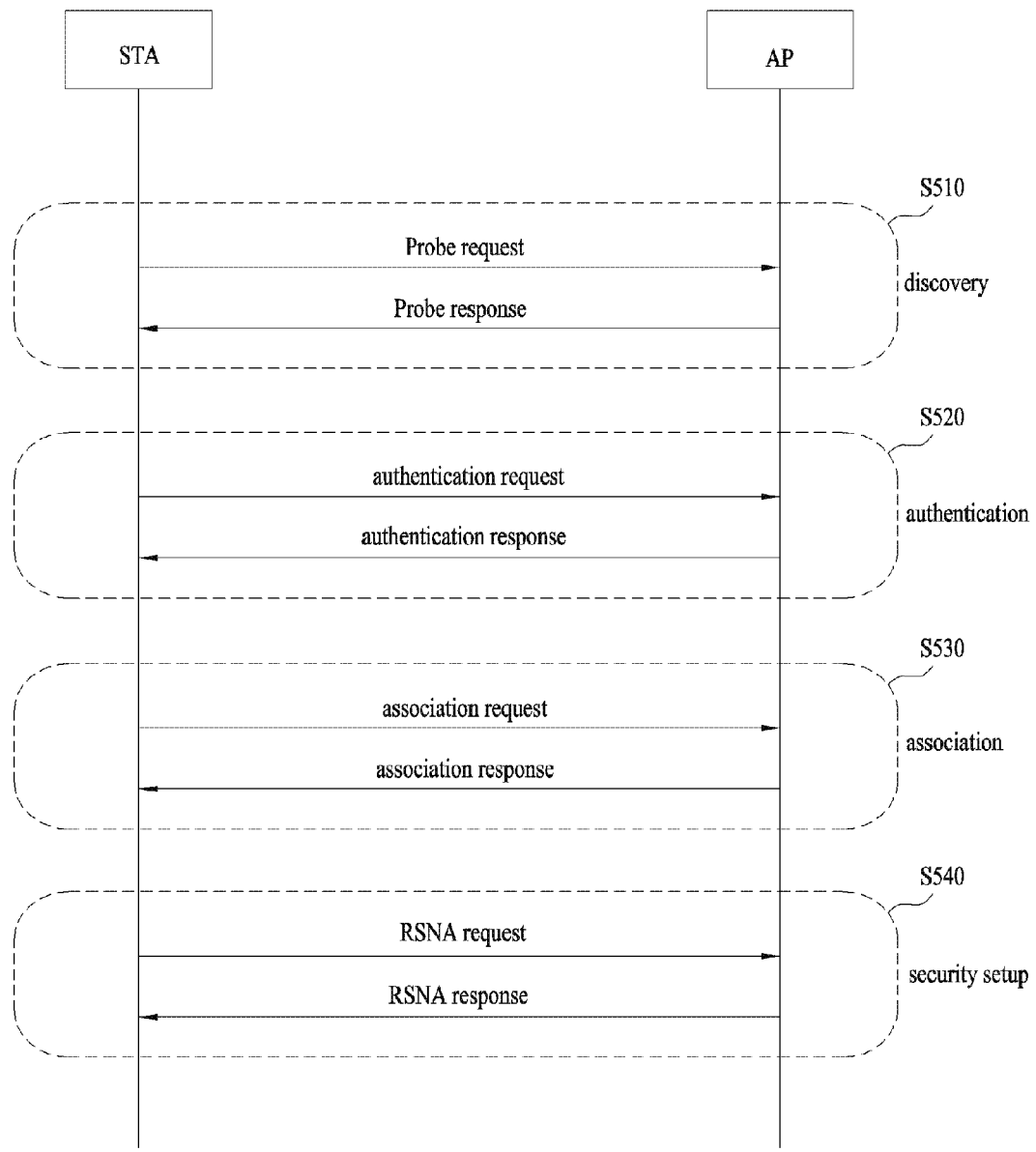
FIG. 4 is a diagram illustrating a general link setup process.
Figure 5:
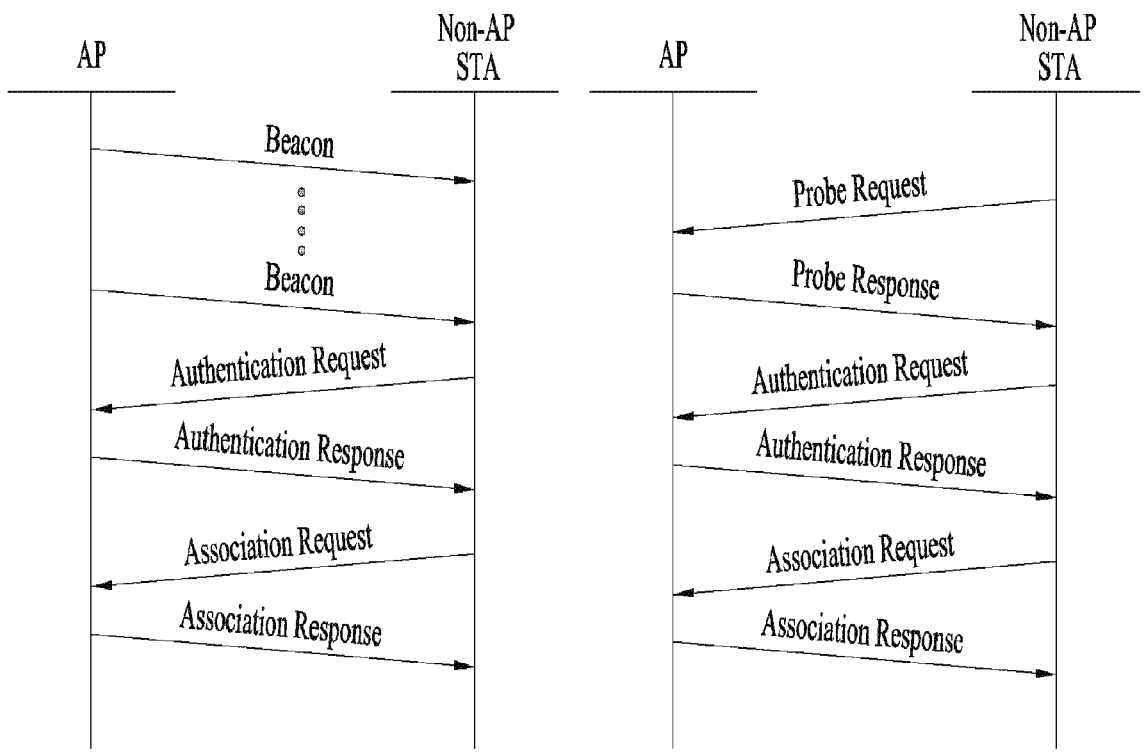
FIG. 5 is a diagram illustrating active and passive scanning methods.

FIG. 4 is a diagram illustrating a general link setup process, and FIG. 5 is a diagram illustrating active and passive scanning methods.

In order to establish link setup on a network and transmit/receive data over the network, the STA should perform processes of network discovery, authentication, association establishment, security setup, etc. The link setup process may also be referred to as a session initiation process or a session setup process. In addition, discovery, authentication, association, and security setup of the link setup process may also called an association process.

An exemplary link setup process will be described with reference to FIG. 4.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning. Although network discovery operation including an active scanning process is shown in FIG. 4, a passive scanning process may be performed.

An STA for performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. In a BSS, since an AP transmits a beacon frame, the AP is a responder. In an IBSS, since STAs of the IBSS alternately transmit the beacon frame, a responder is not constant. For example, an STA, which has transmitted the probe request frame at channel #1 and has received the probe response frame at channel #1, stores BSS-related information contained in the received probe response frame, and moves to the next channel (e.g. channel #2) to perform scanning (i.e. probe request/response transmission and reception at Channel #2) using the same method.

Referring to FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow an STA for performing scanning to search for the wireless network and thus join the wireless network. In a BSS, an AP is configured to periodically transmit the beacon frame and, in an IBSS, STAs in the IBSS are configured to alternately transmit the beacon frame. Upon receipt of the beacon frame, the STA for performing scanning stores BSS-related information contained in the beacon frame and records beacon frame information on each channel while moving to another channel. The STA, which has received the beacon frame, may store BSS-related information contained in the received beacon frame, move to the next channel, and perform scanning on the next channel using the same method.

In comparison between active scanning and passive scanning, the active scanning is more advantageous than passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include the STA transmitting an authentication request frame to an AP, and the AP transmitting an authentication response frame to the STA in response to the authentication request frame. The authentication frame used for authentication request/response may correspond to a management frame.

The authentication frame may include information on an authentication algorithm number, an authentication transaction sequence number, a status code, a challenge text, a Robust Security Network (RSN), a Finite Cyclic Group (FCG), etc. The above-mentioned information may correspond to some parts of information capable of being contained in the authentication request/response frame, may be replaced with other information, or may include additional information.

The STA may transmit the authentication request frame to the AP. The AP may determine whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve the STA transmitting an association request frame to the AP, and the AP transmitting an association response frame to the STA in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a status code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S440 may be referred to as an authentication process using Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking using an (Extensible Authentication Protocol over LAN (EAPOL) frame, for example. In addition, the security setup process may also be carried out according to other security schemes not defined in IEEE 802.11 standards.

Figure 6:
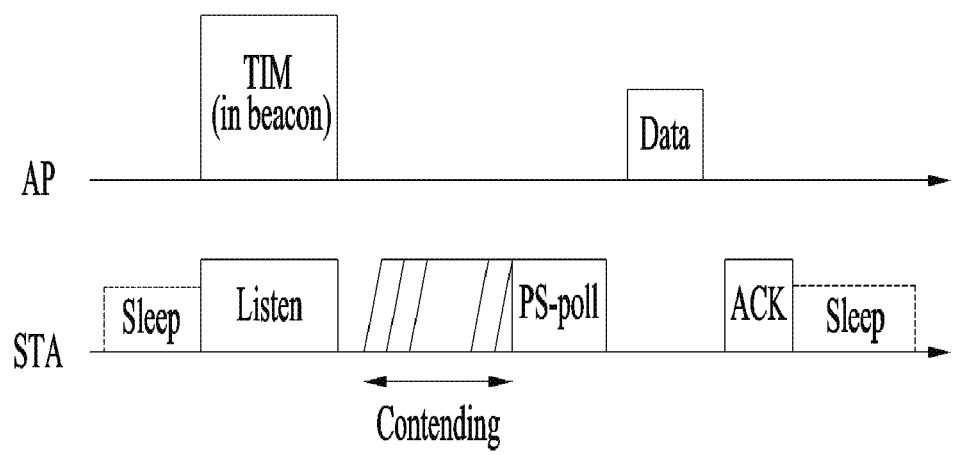
FIGS. 6 to 8 are diagrams illustrating operation of a station, which has received a TIM, in detail.
Figure 7:
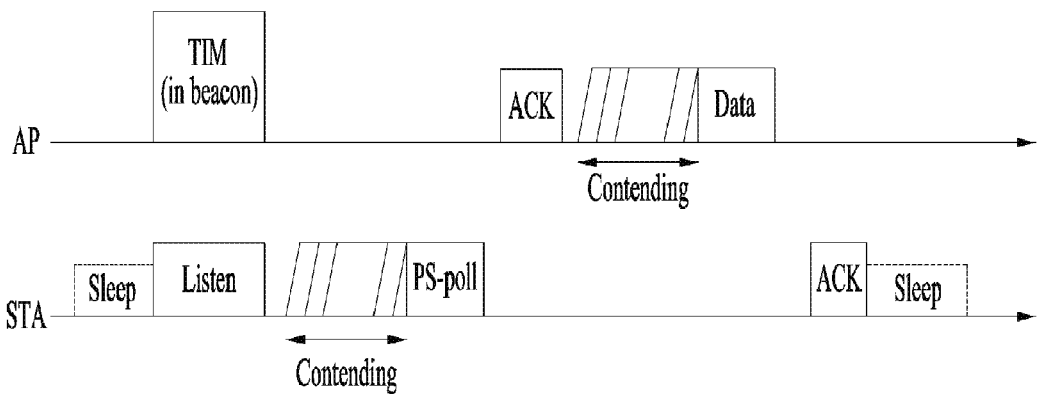
Figure 8:
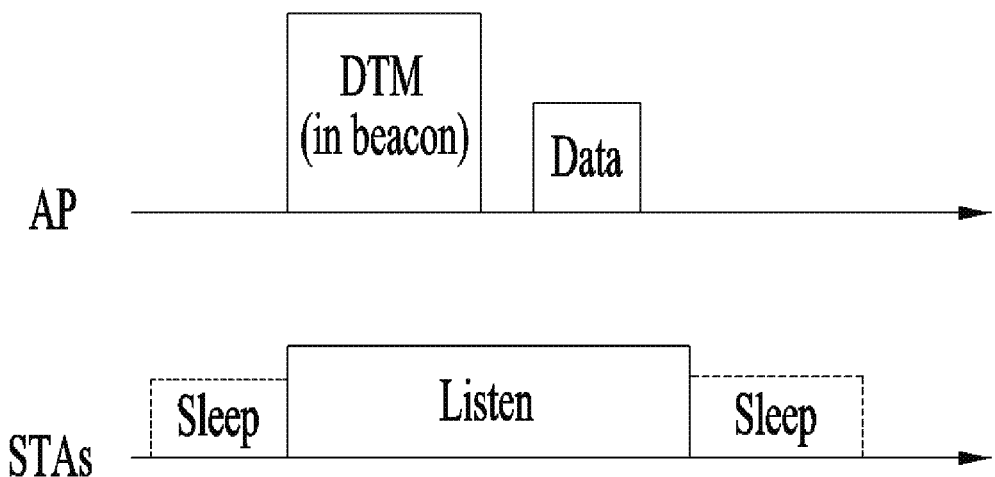
Figure 9:
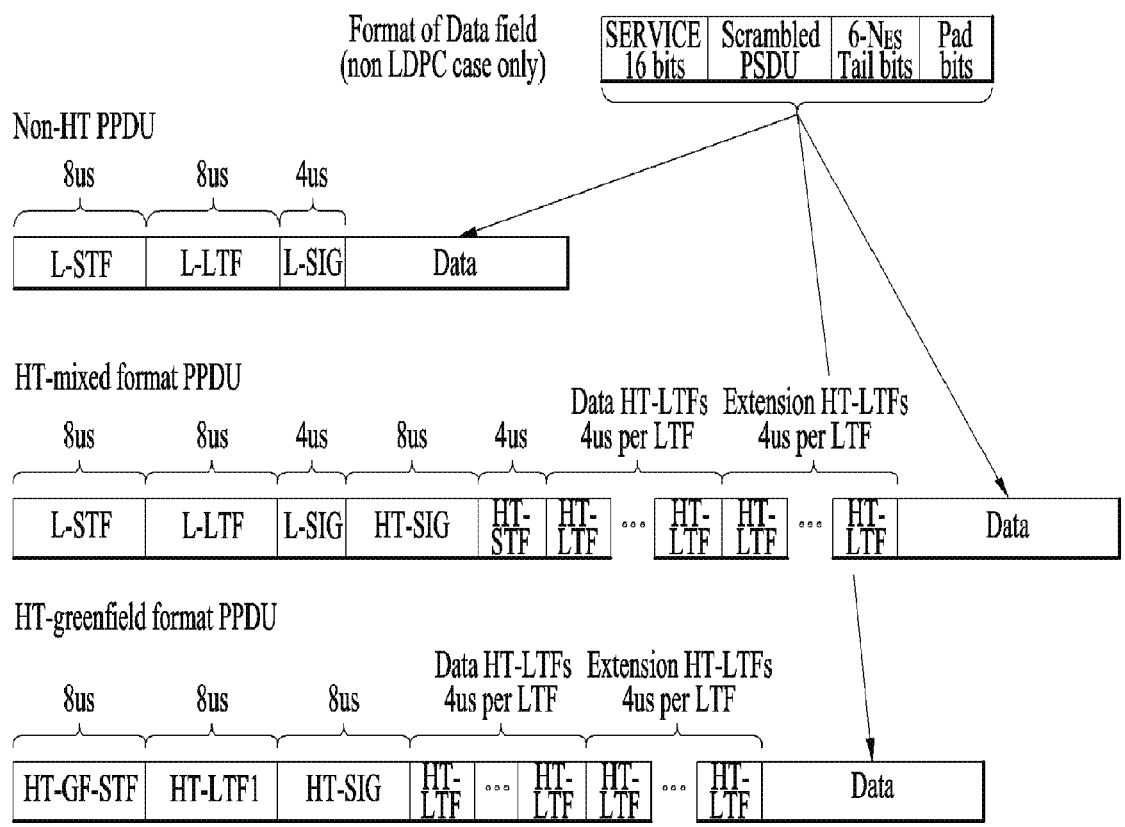

FIGS. 6 to 8 are diagrams illustrating operation of a station, which has received a TIM, in detail.

Referring to FIG. 6, an STA is switched from a sleep state to an awake state so as to receive a beacon frame including a traffic indication map (TIM) from an AP. The STA may recognize the presence of buffered traffic to be transmitted thereto by interpreting the received TIM element. After contending with other STAs to access a medium for PS-Poll frame transmission, the STA may transmit the PS-Poll frame in order to request data frame transmission to the AP. The AP, which has received the PS-Poll frame transmitted by the STA, may transmit the frame to the STA. The STA may receive a data frame and then transmit an ACK frame to the AP in response to the received data frame. Thereafter, the STA may re-enter the sleep state.

As illustrated in FIG. 6, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme, which will be described with reference to FIG. 11.

In the example of FIG. 7, operation for switching STA from a sleep state to an awake state, receiving a TIM from an AP, and transmitting a PS-Poll frame to the AP through contention are identical to those of FIG. 6. Although the PS-Poll frame is received, if the AP does not prepare a data frame during an SIFS time, the AP may transmit an ACK frame to the STA instead of transmitting the data frame. If the data frame is prepared after transmission of the ACK frame, the AP may perform contention and then transmit the data frame to the STA. The STA may transmit the ACK frame indicating that the data frame has successfully been received to the AP and then switch to the sleep state.

FIG. 8 illustrates an example in which an AP transmits a DTIM. STAs may be switched from the sleep state to the awake state in order to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintain the awake state after reception of the beacon frame including the DTIM, the STAs may receive data and then switch to the sleep state after completion of data reception.

FIGS. 9 to 13 are diagrams illustrating an example of a frame structure used in an IEEE 802.11 system.

An STA may receive a physical layer packet data unit (PPDU). At this time, the PPDU frame format may include a short training field (STF), a long training field (LTF), a signal (SIG) field and a data field. At this time, for example, the PPDU frame format may be set based on the type of the PPDU frame format.

For example, a non-high throughput (HT) PPDU frame format may include a legacy-STF (L-STF), a legacy-LTF (L-LTF), an SIG field and a data field.

In addition, any one of an HT-mixed format PPDU and an HT-Greenfield format PPDU may be set as the type of the PPDU frame format. At this time, in the above-described PPDU format, additional (different types of) STFs, LTFs and SIG fields may be included between the SIG field and the data field.

Figure 10:
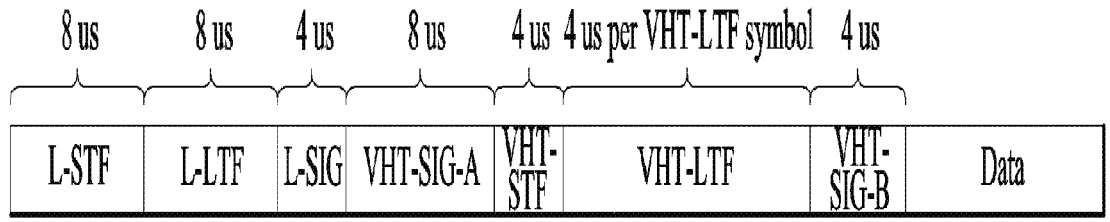

In addition, referring to FIG. 10, a very high throughput (VHT) PPDU format may be set. At this time, even in the VHT PPDU format, additional (different types of) STFs, LTFs and SIG fields may be included between the SIG field and the data field. More specifically, in the VHT PPDU format, at least one of a VHT-SIG-A field, a VHT-STF field, a VHT-LTF field and a VHT SIG-B field may be included between the L-SIG field and the data field.

At this time, the STF is a signal for signal detection, automatic gain control (AGC), diversity selection, accurate time synchronization, etc. and the LTF is a signal for channel estimation, frequency error estimation, etc. A combination of the STF and the LTF may be referred to as a PLCP preamble and the PLCP preamble may refer to a signal for synchronization and channel estimation of an OFDM physical layer.

Figure 11:
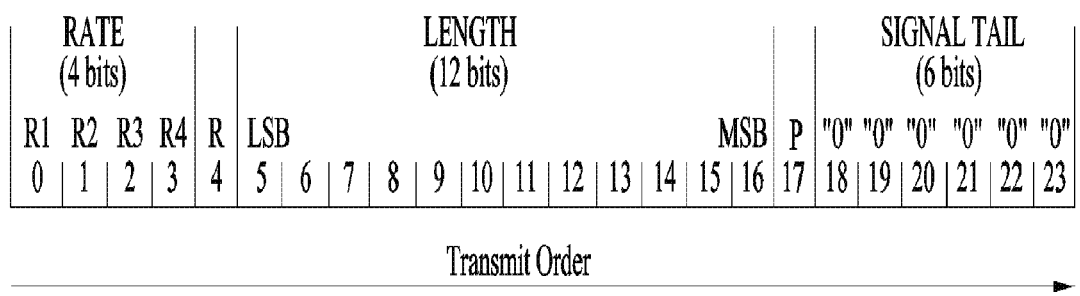

Referring to FIG. 11, the SIG field may include a RATE field and a LENGTH field. The RATE field may include information about modulation and coding rate of data. The LENGTH field may include information about the length of data. Additionally, the SIG field may include a parity bit, an SIG TAIL bit, etc.

The data field may include a SERVICE field, a PLCP service data unit (PSDU) and a PPDU Tail bit and further may include a padding bit if necessary.

Figure 12:
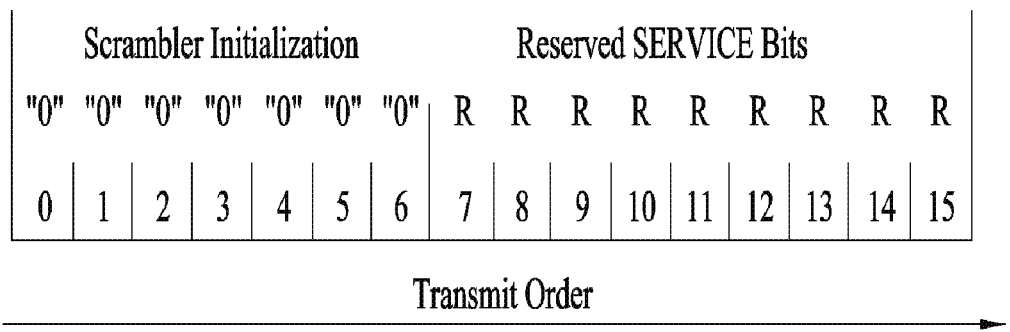

Referring to FIG. 12, some bits of the SERVICE field may be used for synchronization of a descrambler in a receiver, and some bits may be composed of reserved bits. The PSDU corresponds to a MAC protocol data unit (PDU) defined at a MAC layer and may include data created/used at a higher layer. The PPDU Tail bit may be used to return an encoder to a zero state. The padding bit may be used to adjust the length of the data field to a predetermined length.

In addition, for example, as described above, the VHT PPDU format may include the additional (different types of) STFs, LTFs and SIG fields. At this time, in the VHT PPDU, L-STF, L-LTF and L-SIG may be a part of non-VHT of the VHT PPDU. At this time, in the VHT PPDU, VHT-SIG-A, VHT-STF, VHT-LTF and VHT-SIG-B may be part of VHT. That is, in the VHT PPDU, regions for a Non-VHT field and a VHT field may be defined. At this time, for example, VHT-SIG-A may include information for interpreting the VHT PPDU.

At this time, for example, referring to FIG. 13, VHT-SIG-A may be composed of VHT SIG-A1 ((a) of FIG. 13) and VHT SIG-A2 ((b) of FIG. 13). At this time, each of VHT SIG-A1 and VHT SIG-A2 may include 24 data bits and VHT SIG-A1 may be transmitted earlier than VHT SIG-A2. At this time, VHT SIG-A1 may include a BW field, an STBC field, a Group ID field, an NSTS/Partial AID field, a TXOP_PS_NOT_ALLOWED field and a Reserved field. In addition, VHT SIG-A2 may include a Short GI field, a Short GI NSYM Disambiguation field, an SU/MU[0] Coding field, an LDPC Extra OFDM Symbol field, an SU VHT-MCS/MU[1-3] Coding field, a Beamformed field, a CRC field, a Tail field and a Reserved field. Through this, information on the VHT PPDU may be confirmed.

FIGS. 14 to 16 are diagrams showing a MAC frame format.

An STA may receive a PPDU based on any one of the above-described PPDU formats. At this time, the PSDU of the data part of the PPDU frame format may include a MAC PDU. At this time, the MAC PDU may be defined according to various MAC frame formats and a basic MAC frame may be composed of a MAC header, a frame body and a frame check sequence (FCS).

At this time, for example, referring to FIG. 14, the MAC header includes a frame control field, a duration/ID field, an address field, a sequence control field, a QoS control field, an HT control subfield, etc. At this time, the frame control field of the MAC header may include control information necessary for frame transmission/reception. The duration/ID field may be set to a time for transmitting the frame. In addition, the address field may include identification information of a transmitter and a receiver, which will be described below. In addition, for a detailed description of the sequence control field, the QoS control field, and the HT control field, refer to the IEEE 802.11 standard.

At this time, for example, the HT control field may have two forms including an HT variant and a VHT variant. At this time, information included in the HT control field may be changed according to form. In addition, referring to FIGS. 15 and 16, the VHT subfield of the HT control field may indicate whether the HT control field has an HT variant or a VHT variant. At this time, for example, the value "0" of the VHT subfield indicates an HT variant and the value "1" of the VHT subfield indicates a VHT variant.

At this time, for example, referring to FIG. 15, if the HT control field has an HT variant, the HT control field may include a Link Adaptation Control field, a Calibration Position field, a Calibration Sequence field, a CSI/Steering field, an HT NDP Announcement field, an AC constraint field, an RDG/More PPDU field and a Reserved field. At this time, for example, referring to FIG. 15, the Link Adaptation Control field may include a TRQ field, a MAI field, a MFSI field and an MFB/ASELC field. For a detailed description thereof, refer to the IEEE802.11 standard.

In addition, for example, referring to FIG. 16, if the HT Control field has a VHT variant, the HT Control field may include a MRQ field, an MSI field, a MFSI/GID-LM field, an MFB GID-H field, a Coding Type field, an FB Tx Type field, an FB Tx Type field, an unsolicited MFB field, an AC constraint field, an RDG/More PPDU field and a Reserved field. At this time, for example, referring to b of FIG. 16, the MFB field may include a VHT N_STS field, an MCS field, a BW field, an SNR field, etc.

FIG. 17 is a diagram showing a short MAC frame format. The MAC frame may be configured in the form of a short MAC frame, if necessary, in order to reduce unnecessary information to prevent waste of radio resources. At this time, for example, referring to FIG. 17, the MAC header of the short frame may always include a frame control field, an A1 field and an A2 field. In addition, a sequence control field, an A3 field and an A4 field may be selectively included. To this end, information unnecessary for the MAC frame may be omitted to prevent waste of radio resources.

At this time, for example, the frame control field of the MAC header may include a Protocol Version field, a Type field, a PTID/Subtype field, a From DS field, a More Fragment field, a Power Management field, a More Data field, a Protected Frame field, an End of Service Period field, a Relayed Frame field and an Ack Policy field. For a description of each subfield of the frame control field, refer to the IEEE802.11 standard.

The Type field of the frame control field of the MAC header has 3 bits and values of 0 to 3 include address information and values of 4 to 7 may be reserved. In the present invention, new address information may be indicated using the reserved values, which will be described below.

In addition, the From DS field of the control frame field of the MAC header may have 1 bit.

In addition, each of the More Fragment field, the Power Management field, the More Data field, the Protected Frame field, the End of Service Period field, the Relayed Frame field and the Ack Policy field may have 1 bit. At this time, the Ack Policy field may have 1 bit as ACK/NACK information.

In association with STAs including the frame configured in the above-described form, a VHT access point (AP) station may support a non-AP VHT station operating in a transmit opportunity (TXOP) power save mode in one BSS. At this time, for example, the non-AP VHT station may be in an active state and may operate in a TXOP power save mode. At this time, the AP VHT station may switch the non-AP VHT station to a doze state during TXOP. At this time, for example, the AP VHT station may set TXOP_PS-_NOT_ALLOWED, which is a TXVECTOR parameter, to 0 and transmit a VHT PPDU, thereby indicating switching to the doze state. At this time, parameters included in the TXVECTOR transmitted by the AP VHT station along with the VHT PPDU may be changed from 1 to 0 and maintained. To this end, it is possible to save power during the remaining TXOP.

In contrast, if a TXOP_PS_NOT_ALLOWED is set to 1 not to save power, the parameters included in the TXVECTOR may not be changed.

In addition, for example, as described above, when the non-AP VHT station is switched from the TXOP power save mode to the doze state during the TXOP, the following conditions may be satisfied.

the VHT MU PPDU is received and the station is not indicated as a member of a group by a Group_ID which is an RXVECTOR parameter the SU PPDU is received and the station sets a PARTIAL_AID, which is an RXVECTOR parameter, is not 0 or the PARTIAL_AID is not identical to a partial AID of the station the station determines that the PARTIAL_AID, which is an RXVECTOR parameter, is identical to the partial AID of the station, but the receiver address included in the MAC header is not identical to the MAC address of the station the station is indicated as a member of a group by a GROUP_ID, which is an RXVECTOR parameter, but a NUM_STS, which is an RXVECTOR parameter, is set to 0 a VHT NDP Announcement frame is received and the station sets the PARTIAL_AID, which is an RXVECTOR parameter, to 0 and the PARTIAL_AID is not identical to an AID included in the Info field of the station the station sets the More Data field to 0, receives a frame having an ACK Policy subfield set to No Ack or transmits Ack in a state in which the ACK Policy subfield is not set to No Ack At this time, the AP VHT station may include a Duration/ID value set to the remaining TXOP duration and a NAV-SET sequence (e.g., RTS/CTS). At this time, the AP VHT station may not transmit a frame to the non-AP VHT station switched to the doze state based on the above-described conditions during the remaining TXOP.

In addition, for example, if the AP VHT station transmits the VHT PPDU and the TXOP_PS_NOT_ALLOWED as a TXVECTOR parameter, which is set to 0, during the same TXOP and does not want the station to switch from the active state to the doze state, the AP VHT station may not transmit a VHT SU PPDU.

In addition, for example, the AP VHT station may not transmit a frame to the VHT station which is switched to the doze state, until the NAV set upon starting the TXOP is expired.

At this time, if the AP VHT station receives ACK after transmitting a frame including at least one of an MSDU, an S-MSDU and an MMPDU in a state in which the More Data field is set to 0, the frame may be retransmitted at least once during the same TXOP. At this time, for example, if ACK is not received after retransmission in a last frame of the same TXOP, the frame may be retransmitted in a next TXOP.

In addition, for example, the AP VHT station may receive a BlockAck frame from the VHT station operating in the TXOP power save mode. At this time, the BlockAck frame may be a response to the A-MPDU including an MPDU in which the More Data field is set to 0. At this time, since the AP VHT station is in the doze state, a response to the sub sequence of the MPDU retransmitted in the same TXOP may not be received.

In addition, the VHT station, which operates in the TXOP power save mode and switches to the doze state, may operate a NAV timer in the doze state. At this time, for example, if the timer expires, the VHT station may be switched to an awake state.

In addition, the station may perform contention for medium access if the NAV timer expires.

PPDU Transmit Bandwidth

Figure 18:
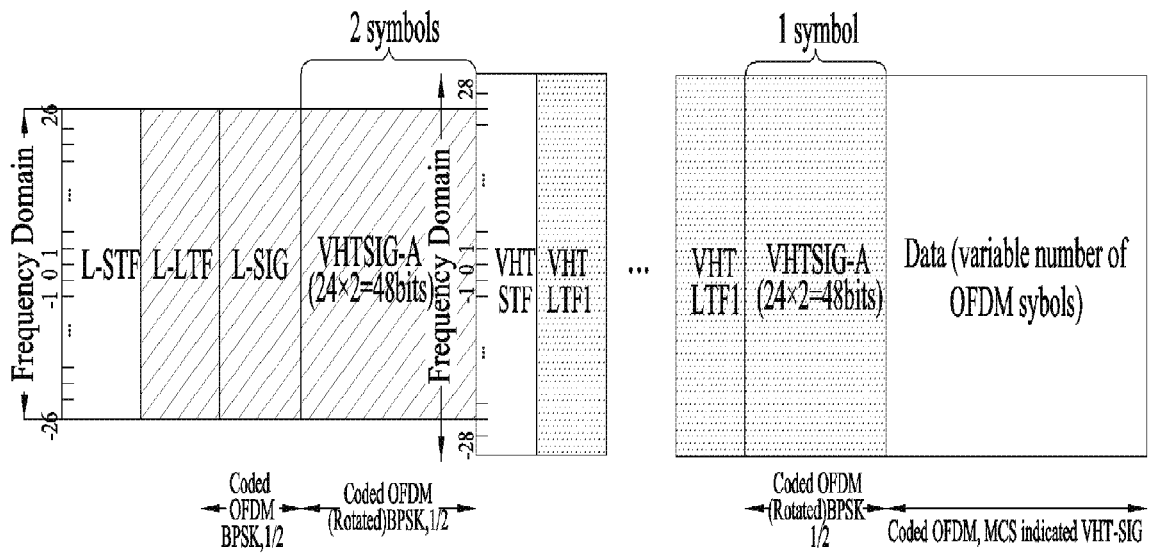
FIGS. 18 to 20 are diagrams showing various bandwidths, with which PPDUs may be transmitted.
Figure 19:
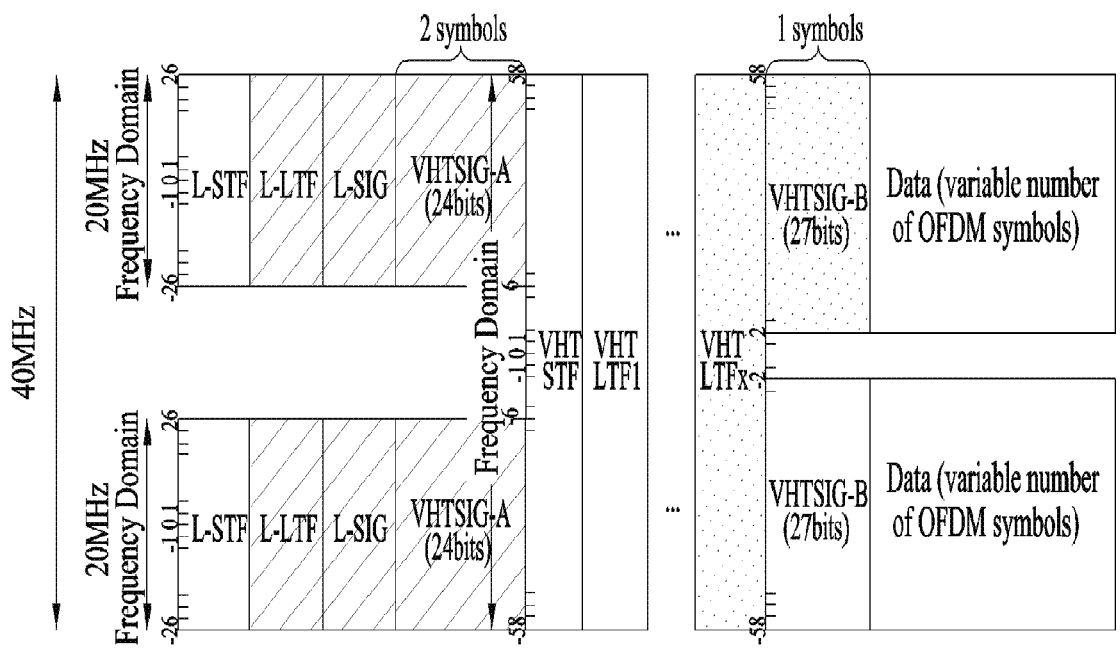
Figure 20:
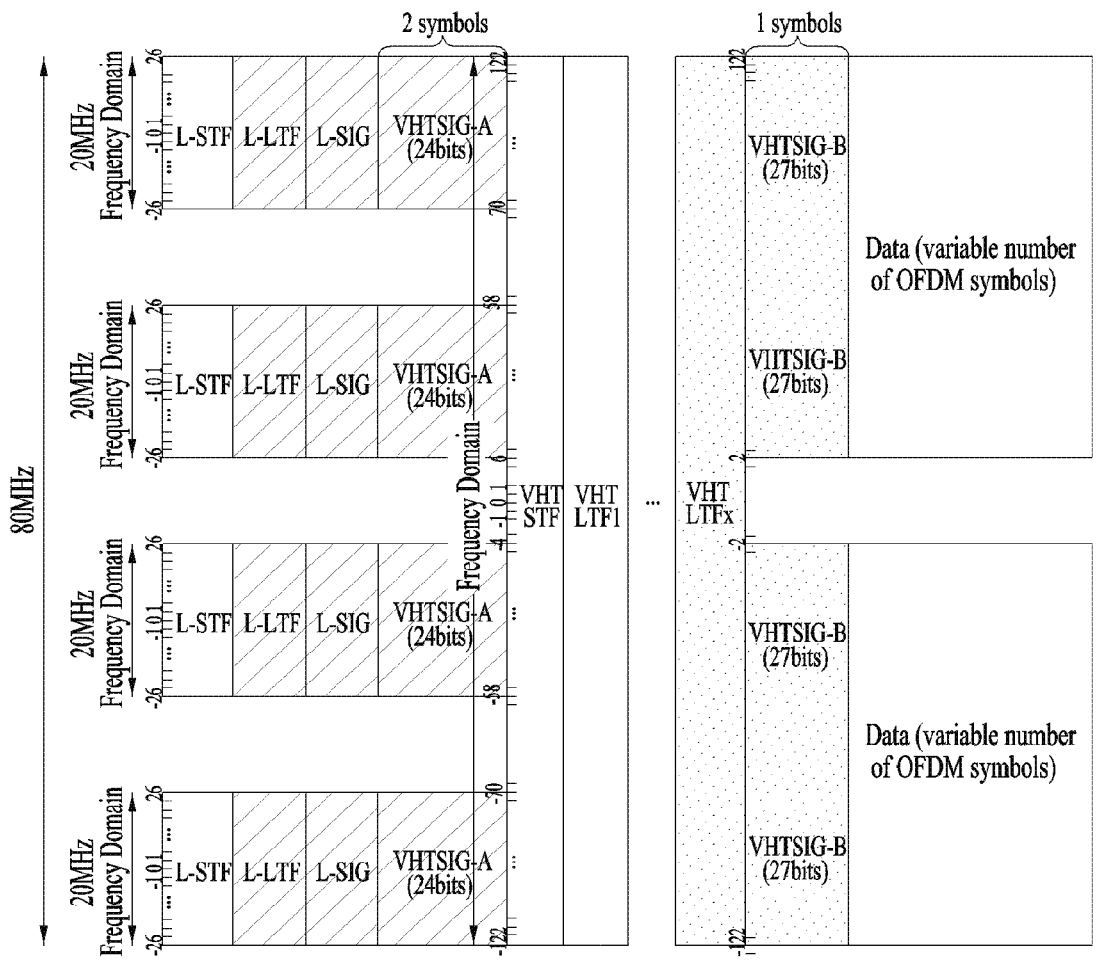

FIGS. 18 to 20 are diagrams showing various bandwidths, with which a PPDU may be transmitted.

More specifically, in an 11ac system, frame transmission of units of 20, 40, 80, 160 or 80+80 MHz is possible. FIG. 18 shows the case where a PPDU is transmitted with bandwidth of 20 MHz, FIG. 19 shows the case where a PPDU is transmitted with bandwidth of 40 MHz and FIG. 20 shows the case where a PPDU is transmitted with bandwidth of 80 MHz.

Assume that an 11ax system applicable to the present invention may transmit a PPDU with various bandwidths as described above. Hereinafter, the frame format of the 11ax system will be used.

Figure 21:
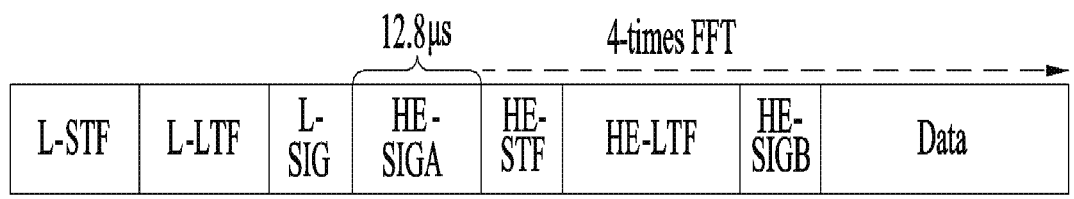
FIGS. 21 and 22 are diagrams showing a PPDU format in an IEEE 802.11ax system, to which the present invention is applicable.
Figure 22:
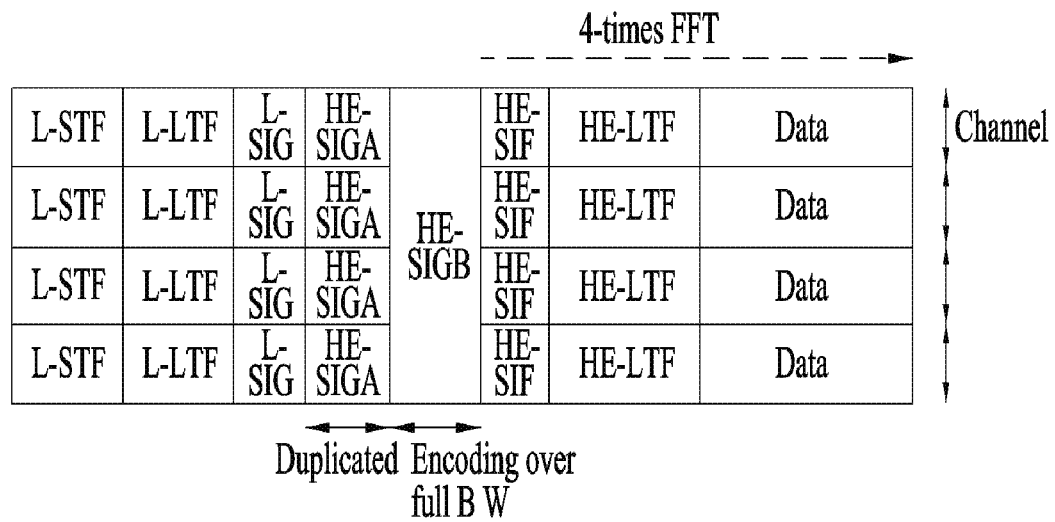

FIGS. 21 and 22 are diagrams showing a PPDU format in an IEEE 802.11ax system, to which the present invention is applicable.

As shown in FIG. 21, the PPDU of the flax system may be divided into an L-part for legacy STAs and an HE-part for 11ax STAs. The L-part prevents collision between legacy STAs and may follow a transmission scheme according to a legacy standard.

HE-SIG A may include common control information (e.g., a bandwidth, a guard interval (GI) length and a BSS color field) for 11ax STAs and the HE-part including an HE-STF field and subsequent fields thereof has four times an FFT length. When the PPDU is transmitted to/received from a plurality of STAs, an HE-SIG B field may be included as a field including per-STA control information (e.g., STA AID, resource allocation information (e.g., allocation size), MCS, Nsts, Coding, STBC and TXBF). That is, the PPDU of 11ax includes two separate signaling fields, which may be referred to as a first signaling field and a second signaling field or HE-SIG A and HE-SIG B. Hereinafter, for convenience, HE-SIG A and HE-SIG B are used.

Meanwhile, a data field may be included after an HE-preamble (HE-SIG A, HE-STF, HE-LTF and HE-SIG B). Since a plurality of STAs may transmit or receive data through this data field, HE-SIG B may include data transmission resource allocation information of the plurality of STAs.

FIG. 22 shows an example in which an HE PPDU is transmitted with a wide bandwidth of 80 MHz. The PPDU used in FIG. 22 may have fields, the order of which is different from that of the fields shown in FIG. 21. The order of the fields of the HE PPDU may be variously changed.

If wideband transmission is performed as shown in FIG. 22, HE-SIG A including common control information may be duplicated and transmitted in units of 20 MHz, similarly to the L-part. Although HE-SIG B including per-STA control information is encoded and transmitted over full bandwidth in the example of FIG. 22, the present invention is not limited thereto and HE-SIB may be transmitted using various methods as described below.

Figure 23:
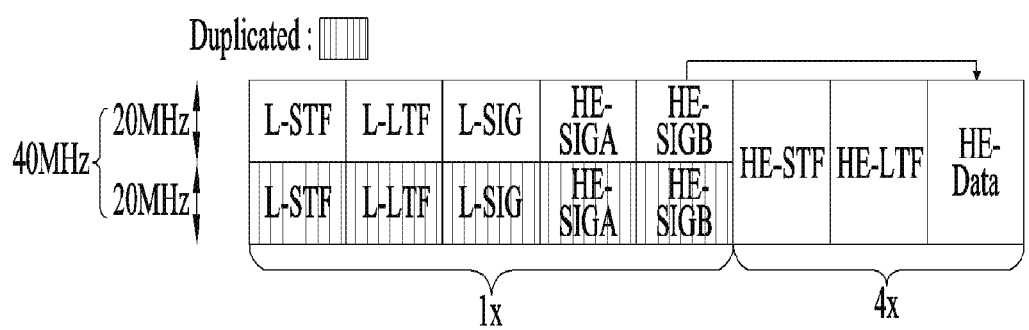

FIGS. 23 to 25 are diagrams illustrating a method of transmitting HE-SIG B according to various embodiments of the present invention.

First, FIG. 23 shows the case where, if HE-SIG B is transmitted with a bandwidth of 40 MHz, HE-SIG B information transmitted through the first 20-MHz band is duplicated and transmitted through the second 20-MHz band. If HE-SIG B information is configured in the form duplicated in units of 20 MHz, it is possible to obtain gain according to duplication.

If HE-SIG B is configured in the form duplicated as shown in FIG. 23, HE-SIG B transmitted through a specific 20-MHz band may include not only the 20-MHz band but also data transmission resource allocation information for another 20-MHz band.

FIG. 24 shows the case where, if HE-SIG B is transmitted with a bandwidth of 40 MHz, independent control information may be included and transmitted through each 20-MHz band. If independent HE-SIG B information is transmitted in units of 20 MHz, as shown in FIG. 24, each 20-MHz HE-SIG B may be transmitted in a state of including data transmission resource allocation information of the 20-MHz band. Therefore, it is possible to more flexibly allocate resources to the STAs.

Meanwhile, FIG. 25 shows the case where, as a combination of FIGS. 23 and 24, independent control information denoted by 1 and 2 is transmitted through each 20-MHz band as shown in FIG. 24 if HE-SIGB is transmitted in units of 40 MHz and control information indicated by 1 and 2, which is transmitted through the first 40-MHz band, is duplicated and transmitted through the second 40-MHz band. Similarly, if HE-SIG B is transmitted through a 160-MHz band, control information indicated by 1 and 2, which is transmitted through the first 40-MHz band, may be duplicated and transmitted once more.

The combination structure of FIG. 25 may be regarded as a combination of the duplication method of FIG. 23 and the independent transmission method of FIG. 24.

Hereinafter, a data transmission resource allocation method based on HE-SIG B will be described in detail.

Non-Contiguous Resource Allocation Method

In one embodiment of the present invention, a method of allocating non-contiguous resources to a specific STA in HE-SIG B is proposed.

Figure 26:
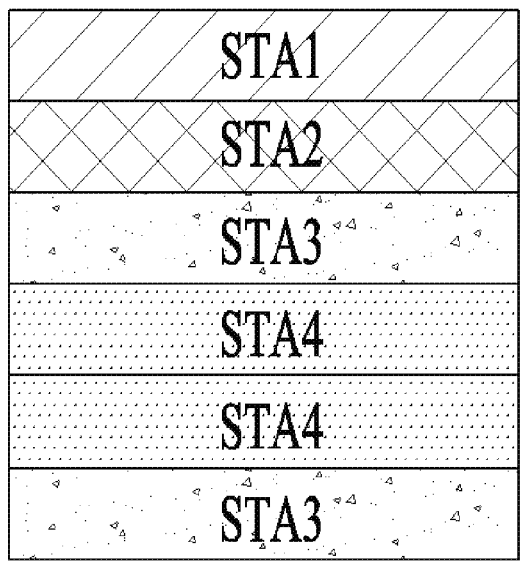
FIG. 26 is a diagram illustrating a method of allocating non-contiguous resources to a specific STA according to an embodiment of the present invention.

FIG. 26 is a diagram illustrating a method of allocating non-continuous resources to a specific STA according to an embodiment of the present invention.

When an AP allocates resources to STAs in the form of OFDMA, as shown in FIG. 26, resources may be non-contiguously allocated to a specific STA, that is, STA 3. The reason why the AP non-contiguously allocates resources to the STAs is because a good channel differs between STAs. If a good channel is used, resource use efficiency may be increased.

Figure 27:
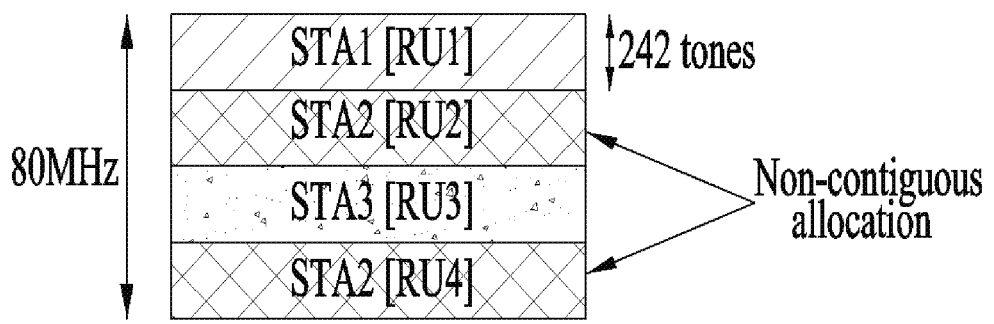
FIG. 27 is a diagram illustrating the unit of allocated resources in non-contiguous resource allocation of FIG. 26.

FIG. 27 is a diagram illustrating the unit of allocated resources in non-contiguous resource allocation of FIG. 26.

In the present embodiment, in order to reduce allocation complexity, non-contiguous resource allocation is performed in units of a multiple (e.g., two 242-tone units, three 242-tone units, . . . , n 242-tone units) of a 242-tone unit (corresponding to bandwidth of about 20 MHz). In the example of FIG. 27, two 242-tone units are allocated to STA2. The 242-tone unit may be referred to as a resource unit (RU).

Hereinafter, a method of supporting non-contiguous resource allocation in consideration of various HE-SIG B transmission structures will be described.

Figure 28:
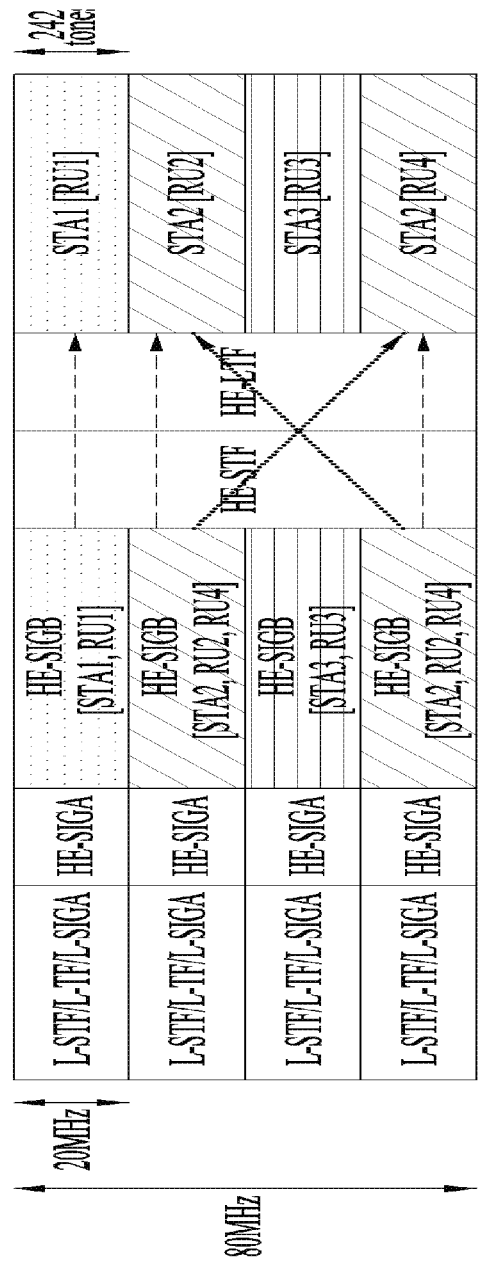
FIG. 28 is a diagram illustrating a method of non-contiguously allocating resources while transmitting independent HE-SIG B in units of 20 MHz according to an embodiment of the present invention.

FIG. 28 is a diagram illustrating a method of non-contiguously allocating resources while transmitting independent HE-SIG B in units of 20 MHz according to an embodiment of the present invention.

In the present embodiment, in each independent HE-SIG-B corresponding to non-contiguous resources, a method of duplicating and including non-contiguous resource information in different non-contiguous bands is proposed.

In the example of FIG. 28, STA1 is allocated RU1 in first HE-SIG-B and STA2 is allocated RU2 and RU4 in the second HE-SIG-B and the fourth HE-SIG-B. STA3 is allocated RU3 in the third HE-SIG-B.

That is, as shown in FIG. 28, if independent HE-SIG B is transmitted through each 20-MHz band, in order to allocate non-contiguous resources (e.g., RU2 and RU4) to a specific STA (e.g., STA2), the same HE-SIG B control information may be duplicated and transmitted in RU2 and RU4.

As a detailed example, non-contiguous resources may be allocated in HE-SIG B using the following example.

TABLE 1

HE-SIG-B
{
    Resource allocation information
    If Resource allocation information is identical to 242 x (any one
    of 2 and 3)){
        RA type (1 bit, 0: contiguous allocation, 1: non-contiguous
        allocation)
        If (RA type == 1) {
            Non-contiguous allocation bitmap (NCA bitmap)
        }
    }
}

For example, the size of a non-contiguous allocation (NCA) bitmap is 4 bits and may correspond to four chunks (e.g., a unit composed of 242 tones). For example, a first bit may correspond to the first 242 tones, a second bit may correspond to the second 242 tones, a third bit may correspond to the third 242 tones and a fourth bit may correspond to the fourth 242 tones.

In the above example, 80 MHz was used. In the case of 160 MHz, the above-described structure may be duplicated in units of 80 MHz or doubled (e.g., the size of the NCA bitmap is 8 bits).

In the present embodiment supporting a non-contiguous resource allocation mode, if HE-SIG B does not include RA type information, a non-contiguous allocation bitmap may always be included with respect to 242×2 or 242×3.

Figure 29:
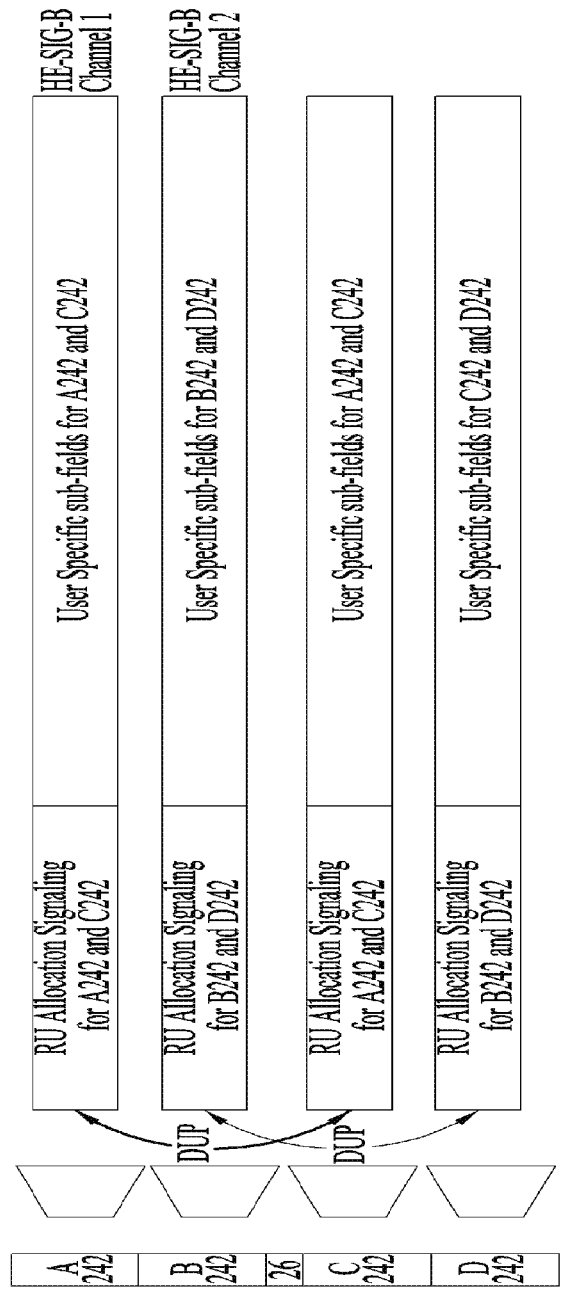
FIG. 29 is a diagram illustrating the case where HE-SIG B resource allocation information of a specific 20-MHz band is repeatedly transmitted in HE-SIG B of another non-contiguous 20-MHz band according to another embodiment of the present invention.

The above-described resource structure may be equally used even when non-contiguous data transmission resource allocation is not supported. For example, data transmission resource allocation information of a specific STA in HE-SIG B of a specific 20-MHz band may be repeatedly transmitted in HE-SIG B of another non-contiguous 20-MHz band for another reason. FIG. 29 shows such an example.

FIG. 29 is a diagram illustrating the case where HE-SIG B resource allocation information of a specific 20-MHz band is repeatedly transmitted in HE-SIG B of another non-contiguous 20-MHz band according to another embodiment of the present invention.

In FIG. 29, in the HE-SIG B transmission structure, assume that control information is independently configured and transmitted in units of 20 MHz within the first 40-MHz band as described above with reference to FIG. 25 and control information of the first 40-MHz band is repeated in a next 40-MHz band. Accordingly, as shown in FIG. 29, when there are 242-tone bands A, B, C and D, the same HE-SIG B information may be included in A and C, and the same HE-SIG B information may be included in B and D.

In this case, if STA1 is present in bands A and C as an STA allocated data transmission resources, data transmission resource allocation information of STA1 may be repeatedly transmitted through the bands A and C. In addition, if STA2 is present in bands B and D as an STA allocated data transmission resources, data transmission resource allocation information of STA2 may be repeatedly transmitted through bands B and D.

Structure of Resource Allocation Information

Hereinafter, a method of signaling data transmission resource allocation information will be described.

In an 11ax system, to which the present invention is applicable, a resource unit allocated to each STA may be a multiple of 26 tones or 242 tones ((26×(1, 2, 3 . . . , or 9)) tones or (242×(1, 2, 3 . . . )) tones. In addition, HE-SIG-B in which information of a resource allocation structure is configured as common information on a plurality of STAs and resource allocation information of each STA may be configured and transmitted as per-STA information based on such a structure.

Figure 30:
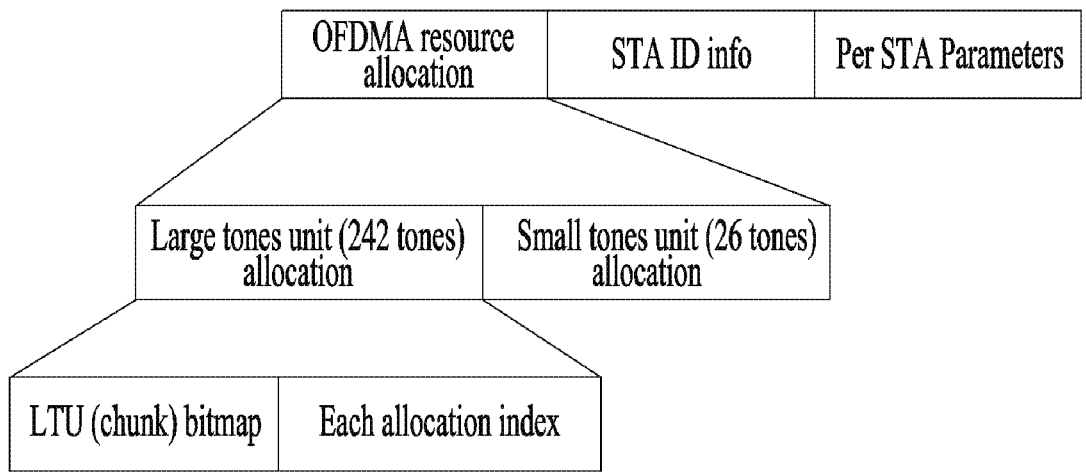
FIG. 30 is a diagram illustrating the structure of resource allocation information included in HE-SIG B according to an embodiment of the present invention.

FIG. 30 is a diagram illustrating the structure of resource allocation information included in HE-SIG B according to an embodiment of the present invention.

As shown in FIG. 30, OFDMA resource allocation information may be included and transmitted in a common control information field for a plurality of STAs in HE-SIG B. In this structure, per-STA resource allocation information including STA ID information and resource allocation information of each STA may be transmitted.

In one embodiment of the present invention, any one of a plurality of combinations including resource unit combinations corresponding to multiples of 242 tones and resource unit combinations corresponding to multiples of 26 tones may be indicated in the form of a bitmap.

As shown in FIG. 30, the resource allocation unit corresponding to 242 tones may be indicated by a long tones unit or large tone unit (LTU) and the resource allocation unit corresponding to 26 tones may be indicated by a small tones unit (STU).

In one embodiment of the present invention, when the 242-tone unit is allocated, non-contiguous resource allocation information may also be included.

As described above, the number of 242-tone units is 1 at 20 MHz, is 2 at 40 MHz and is 4 at 80 MHz. How many and where 242-tone units are allocated may be indicated by a 242-tone bitmap (LTU bitmap). The size of the bitmap is composed of 1 bit/2 bits/4 bits at 20/40/80 MHz and each bit is mapped to an LTU composed of 242 tones and 1 of each bit may indicate allocation in units of 242 tones.

For example, when first and second LTUs are allocated in units of 242 tones at 80 MHz and the remaining LTUs are allocated in units of 26 tones, the bitmap indicates 1100. The number and location of allocated 242 tones may be indicated through the bitmap and the STA should be informed of the method of configuring each 242-tone unit. FIG. 30 shows the structure of the resource allocation information.

The size of the LTU (chunk) bitmap may be set to 1/2/4 at 20/40/80 MHz.

If information indicating a null subband is located in front of OFDMA resource allocation, a value less than 1/2/4 may be set. For example, if one of secondary 20-MHz bands located at the center of a bandwidth of 80 MHz is not used, the LTU bitmap may be composed of 3 bits. In the present embodiment, assume that there is no null subband.

Hereinafter, a method of indicating LTU allocation information using an LTU allocation index will be described.

<Allocation at 20 MHz>

At 20 MHz, since the LTE bitmap has 1 bit, when the bit is set to 1, this indicates that one 242-tone unit is allocated.

<Allocation at 40 MHz>

At 40 MHz, the bitmap of the LTU has 2 bits and a bitmap value 00 indicates that the 242-tone unit is not allocated. 01 and 10 indicate that the 242-tone unit is allocated in each LTU, and the 242 tones indicate 1 OFDMA resource allocation unit and allocation of SU/MU-MIMO can be applied in OFDMA allocation.

A bitmap value 11 indicates that two 242-tone units are both allocated as LTU and a 1-bit LTU index may be defined as follows in order to indicate how to perform allocation.

TABLE 2

LTU allocation index (1 bit):
0: Two LTUs are allocated as 1 allocation
unit (242 X 2) such that allocation of SU or
MU-MIMO can be applied in resources.
1: Two LTUs are configured as different
allocation units such that allocation of SU or
MU-MIMO can be applied in each LTU.

<Allocation at 80 MHz>

At 80 MHz, the bitmap of the LTU has 4 bits and a bitmap value 0000 indicates that the 242-tone unit is not allocated, 0001/0010/0100/1000 indicate that one 242-tone unit is allocated and configured as 1 OFDMA resource allocation unit such that allocation of SU/MU-MIMO can be applied in the LTU.

When two 242-tone units (LTU bitmap: 0011/0101/0110/1001/1010/1100) are allocated as LTU, a 1-bit LTU index may be defined as follows.

TABLE 3

LTU allocation index (1 bit):
0: Two LTUs are allocated as 1 allocation
unit (242 X 2) such that allocation of SU or
MU-MIMO can be applied in resources.
1: Two LTUs are configured as different
allocation units such that allocation of SU or
MU-MIMO can be applied in each LTU.

When three 242-tone units (LTU bitmap: 1110/1101/1011/0111) are allocated as LTU, an LTU index may be defined as shown in Table 4 or 5 below.

TABLE 4

LTU allocation index (3 bits):
000: Three LTUs are allocated as 1 allocation unit (242 x 3) such that allocation of SU
or MU-MIMO can be applied in resources. The LTU bitmap may be limited to 1110 or 0111.
001: Three LTUs are configured as different allocation units such that allocation of SU
or MU-MIMO can be applied in each LTU. This corresponds to the case where the LTU
bitmap is 1110/1101/1011/0111.
010: (242 x 2) is configured as 1 allocation unit and the remaining 242-tone units are
configured as 1 allocation unit. At this time, (242 x 2) is configured as first and second
LTUs. This corresponds to the case where the LTU bitmap is 1110/1101/1011/0111.
011: (242 x 2) is configured as 1 allocation unit and the remaining 242-tone units are
configured as 1 allocation unit. At this time, (242 x 2) is configured as first and third LTUs.
This corresponds to the case where the LTU bitmap is 1110/1101/1011/0111.

TABLE 4-continued

100: (242 x 2) is configured as 1 allocation unit and the remaining 242-tone units are configured as 1 allocation unit. At this time, (242 x 2) is configured as first and third LTUs. This corresponds to the case where the LTU bitmap is 1110/1101/1011/0111.

TABLE 5

LTU allocation index (2 bits):
00: Three LTUs are allocated as different allocation units such that allocation of SU or MU-MIMO can be applied in each LTU. This corresponds to the case where the LTU bitmap is 1110/1101/1011/0111.
01: (242 x 2) is configured as 1 allocation unit and the remaining 242-tone units are configured as 1 allocation unit. At this time, (242 x 2) is configured as first and second LTUs. This corresponds to the case where the LTU bitmap is 1110/1101/1011/0111.
10: (242 x 2) is configured as 1 allocation unit and the remaining 242-tone units are configured as 1 allocation unit. At this time, (242 x 2) is configured as first and third LTUs. This corresponds to the case where the LTU bitmap is 1110/1101/1011/0111.
11: (242 x 2) is configured as 1 allocation unit and the remaining 242-tone units are configured as 1 allocation unit. At this time, (242 x 2) is configured as first and third LTUs. This corresponds to the case where the LTU bitmap is 1110/1101/1011/0111.

When four 242-tone units (LTU bitmap: 1111) are allocated as LTU, an LTU index may be defined as shown in Table 6 or 7 below.

TABLE 6

LTU allocation index (5 bits):
00000: Four LTUs are allocated as 1 allocation unit (242 x 4) such that allocation of SU or MU-MIMO can be applied in resources. This corresponds to the case where the LTU bitmap is 1110 or 0111.
00001: Four LTUs are configured as different allocation units such that allocation of SU or MU-MIMO can be applied in each LTU.
0010: (242 x 2) is configured as 1 allocation unit and each of the remaining two 242-tone units is configured as 1 allocation unit. At this time, (242 x 2) is configured as first and second LTUs.
00011: (242 x 2) is configured as 1 allocation unit and each of the remaining two 242-tone units is configured as 1 allocation unit. At this time, (242 x 2) is configured as first and third LTUs.
00100: (242 x 2) is configured as 1 allocation unit and each of the remaining two 242-tone units is configured as 1 allocation unit. At this time, (242 x 2) is configured as first and fourth LTUs.
00101: (242 x 2) is configured as 1 allocation unit and each of the remaining two 242-tone units is configured as 1 allocation unit. At this time, (242 x 2) is configured as second and third LTUs.
00110: (242 x 2) is configured as 1 allocation unit and each of the remaining two 242-tone units is configured as 1 allocation unit. At this time, (242 x 2) is configured as second and fourth LTUs.
00111: (242 x 2) is configured as 1 allocation unit and each of the remaining two 242-tone units is configured as 1 allocation unit. At this time, (242 x 2) is configured as third and fourth LTUs.
01000: (242 x 2) is configured as 1 allocation unit and the remaining two 242-tone units are configured as another allocation unit of (242 x 2). At this time, the first (242 x 2) unit is configured as first and second LTUs.
01001: (242 x 2) is configured as 1 allocation unit and the remaining two 242-tone units are configured as another allocation unit of (242 x 2). At this time, the first (242 x 2) unit is configured as first and third LTUs.
01010: (242 x 2) is configured as 1 allocation unit and the remaining two 242-tone units are configured as another allocation unit of (242 x 2). At this time, the first (242 x 2) unit is configured as first and fourth LTUs.
01011: (242 x 2) is configured as 1 allocation unit and the remaining two 242-tone units are configured as another allocation unit of (242 x 2). At this time, the first (242 x 2) unit is configured as second and third LTUs.
01100: (242 x 2) is configured as 1 allocation unit and the remaining two 242-tone units are configured as another allocation unit of (242 x 2). At this time, the first (242 x 2) unit is configured as second and fourth LTUs.
01101: (242 x 2) is configured as 1 allocation unit and the remaining two 242-tone units are configured as another allocation unit of (242 x 2). At this time, the first (242 x 2) unit is configured as third and fourth LTUs.
01110: (242 x 3) is configured as 1 allocation unit and the remaining one 242-tone unit is configured as 1 allocation unit. At this time, the first (242 x 3) unit is configured as first, second and third LTUs.
01111: (242 x 3) is configured as 1 allocation unit and the remaining one 242-tone unit is configured as 1 allocation unit. At this time, the first (242 x 3) unit is configured as first, second and fourth LTUs.

TABLE 6-continued

10000: (242 x 3) is configured as 1 allocation unit and the remaining one 242-tone unit is configured as 1 allocation unit. At this time, the first (242 x 3) unit is configured as first, third and fourth LTUs.
10001: (242 x 3) is configured as 1 allocation unit and the remaining one 242-tone unit is configured as 1 allocation unit. At this time, the first (242 x 3) unit is configured as second, third and fourth LTUs.

TABLE 7

LTU allocation index (4 bits):
0000: Four LTUs are allocated as 1 allocation unit (242 x 4) such that allocation of SU or MU-MIMO can be applied in resources. This corresponds to the case where the LTU bitmap is 1110 or 0111.
0001: Four LTUs are configured as different allocation units such that allocation of SU or MU-MIMO can be applied in each LTU.
0010: (242 x 2) is configured as 1 allocation unit and each of the remaining two 242-tone units is configured as 1 allocation unit. At this time, (242 x 2) is configured as first and second LTUs.
0011: (242 x 2) is configured as 1 allocation unit and each of the remaining two 242-tone units is configured as 1 allocation unit. At this time, (242 x 2) is configured as first and third LTUs.
0100: (242 x 2) is configured as 1 allocation unit and each of the remaining two 242-tone units is configured as 1 allocation unit. At this time, (242 x 2) is configured as first and fourth LTUs.
0101: (242 x 2) is configured as 1 allocation unit and each of the remaining two 242-tone units is configured as 1 allocation unit. At this time, (242 x 2) is configured as second and third LTUs.
0110: (242 x 2) is configured as 1 allocation unit and each of the remaining two 242-tone units is configured as 1 allocation unit. At this time, (242 x 2) is configured as second and fourth LTUs.
0111: (242 x 2) is configured as 1 allocation unit and each of the remaining two 242-tone units is configured as 1 allocation unit. At this time, (242 x 2) is configured as third and fourth LTUs.
1000: (242 x 2) is configured as 1 allocation unit and the remaining two 242-tone units are configured as another allocation unit of (242 x 2). At this time, the first (242 x 2) unit is configured as first and second LTUs.
1001: (242 x 2) is configured as 1 allocation unit and the remaining two 242-tone units are configured as another allocation unit of (242 x 2). At this time, the first (242 x 2) unit is configured as first and third LTUs.
1010: (242 x 2) is configured as 1 allocation unit and the remaining two 242-tone units are configured as another allocation unit of (242 x 2). At this time, the first (242 x 2) unit is configured as first and fourth LTUs.
1011: (242 x 2) is configured as 1 allocation unit and the remaining two 242-tone units are configured as another allocation unit of (242 x 2). At this time, the first (242 x 2) unit is configured as second and third LTUs.
1100: (242 x 2) is configured as 1 allocation unit and the remaining two 242-tone units are configured as another allocation unit of (242 x 2). At this time, the first (242 x 2) unit is configured as second and fourth LTUs.
1101: (242 x 2) is configured as 1 allocation unit and the remaining two 242-tone units are configured as another allocation unit of (242 x 2). At this time, the first (242 x 2) unit is configured as third and fourth LTUs.

In the above-described example, OFDMA allocation of the LUT (242 tones) unit is indicated in the form of the LTU index. In this case, since one LTU index indicates 242-tone unit allocation information (the number of allocation units, contiguous/non-contiguous, structure (242×1, 242×2, etc.), lowest overhead (only the LTU index is included in HE-SIG B) occurs. However, a combination is changed according to the bandwidth (20/40/80 MHz) and the bit value indicated by the LTU bitmap (that is, the number of allocated 242-tone units) and information indicated by each index is changed, STAs should previously know a lookup table indicating combination-based indices.

FIGS. 31 to 40 are diagrams illustrating a method of informing STAs of 242-tone unit allocation information without a lookup table according to another embodiment of the present invention.

At 80 MHz, the number of 242-tone units may be set to one of 1/2/3/4 according to the LTU bitmap.

Figure 31:
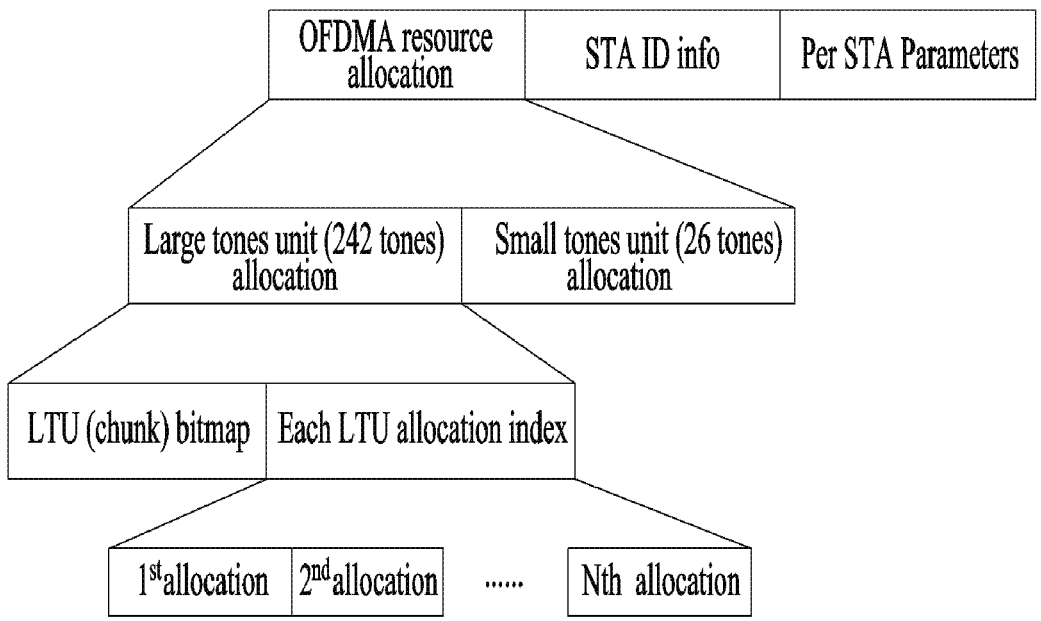
FIGS. 31 to 40 are diagrams illustrating a method of informing STAs of 242 tone unit allocation information without a lookup table according to another embodiment of the present invention.

As shown in FIG. 31, OFDMA resource allocation information is divided into LTU allocation and STU allocation and the LTU allocation includes information on an LTU bitmap and each LTU allocation index.

Figure 32:
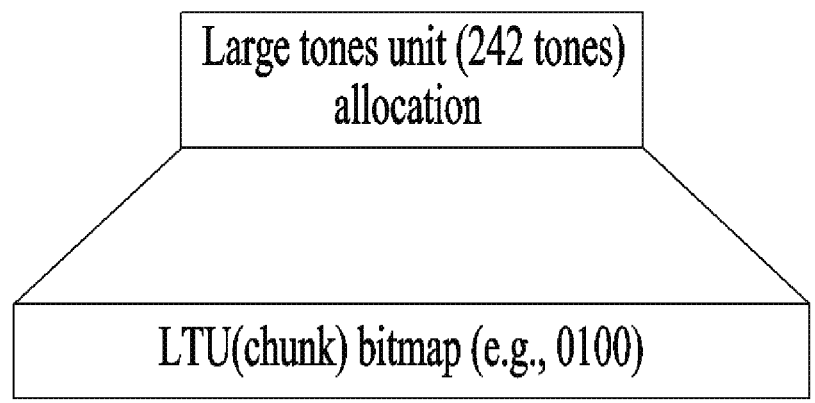

When the number of LTUs is 1 (that is, the number of is in the bitmap is 1), each LTU allocation index may not be included as shown in FIG. 32.

Figure 33:
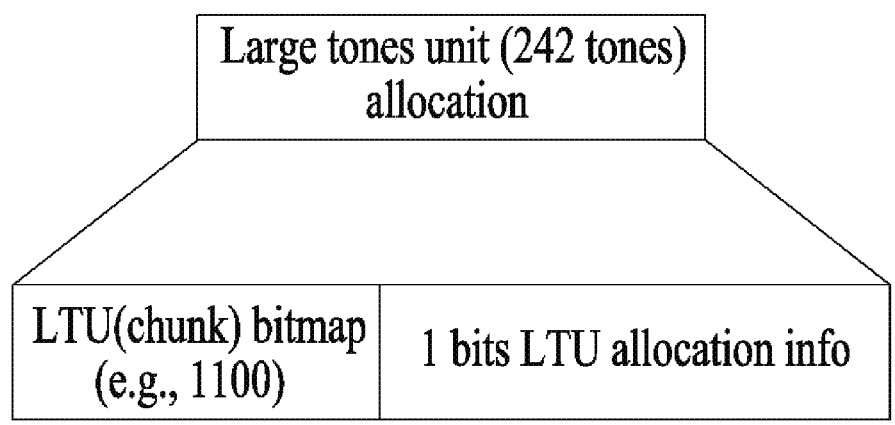

When the number of LTUs is 2 (LTU bitmap: 0011/0101/0110/1001/1010/1100), as shown in FIG. 33, 1-bit LTU allocation information is included and a value thereof may be defined as follows.
  0: Two LTUs are allocated as 1 allocation unit (242×2) such that SU or MU-MIMO can be applied in resources.
  1: Two LTUs are allocated as different allocation units such that SU or MU-MIMO can be applied in resources.

Figure 34:
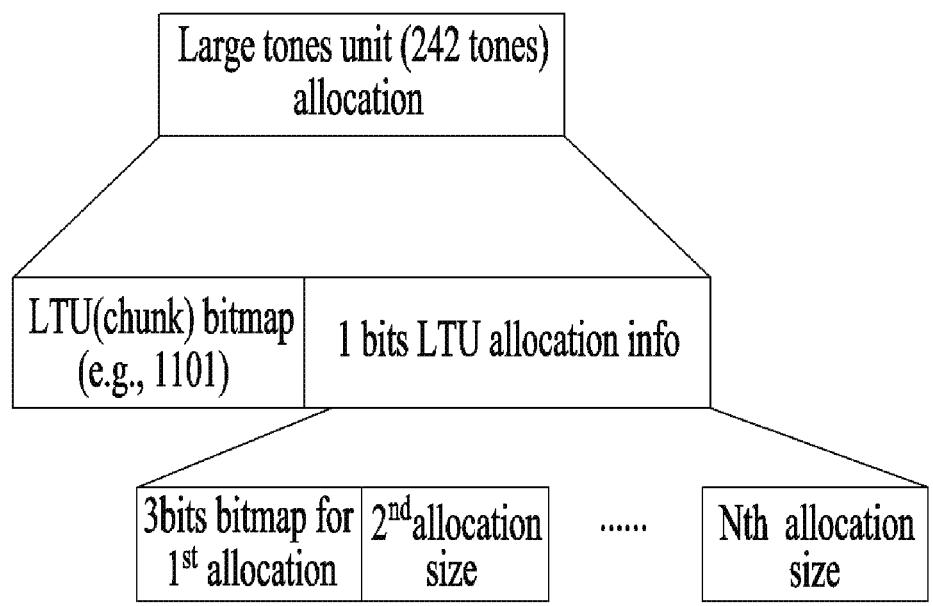

When the number of LTUs is 3 (1110/1101/1011/0111), as shown in FIG. 34, a 3-bit bitmap may indicate allocation information of first allocation and the unit size is indicated in second allocation and subsequent allocations thereof.

The second allocation and subsequent allocations thereof may have a size equal to or less than that of the first allocation. Accordingly, the size information of the second allocation and subsequent allocations thereof may not be included.

Figure 35:
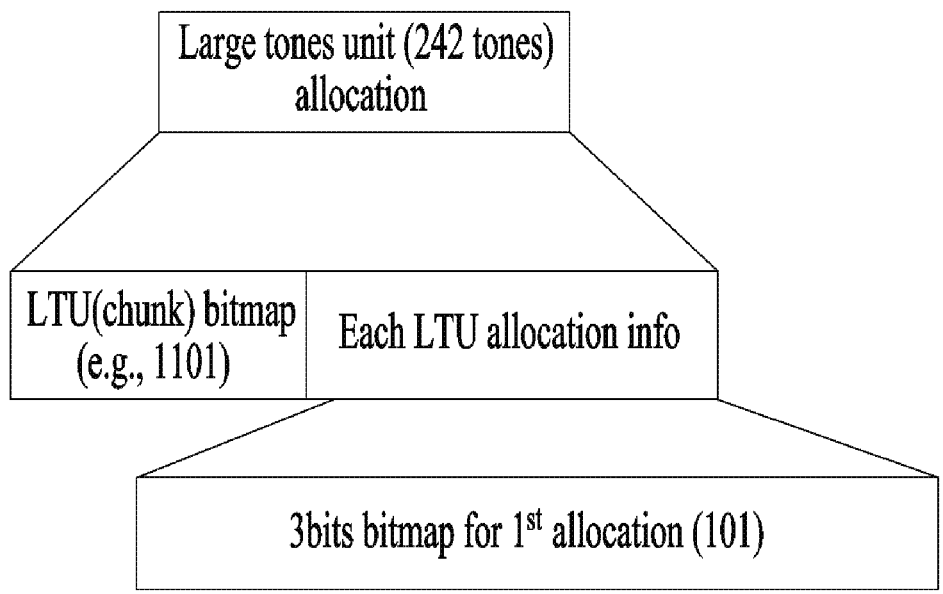

For example, when the LTU bitmap is 1101, if the 3-bit bitmap for the first allocation is set to 101, the first LTU allocation indicates allocation of the first and fourth LTUs and last LTU allocation is automatically allocated 1 LTU (second LTU). An example thereof is shown in FIG. 35.

Figure 36:
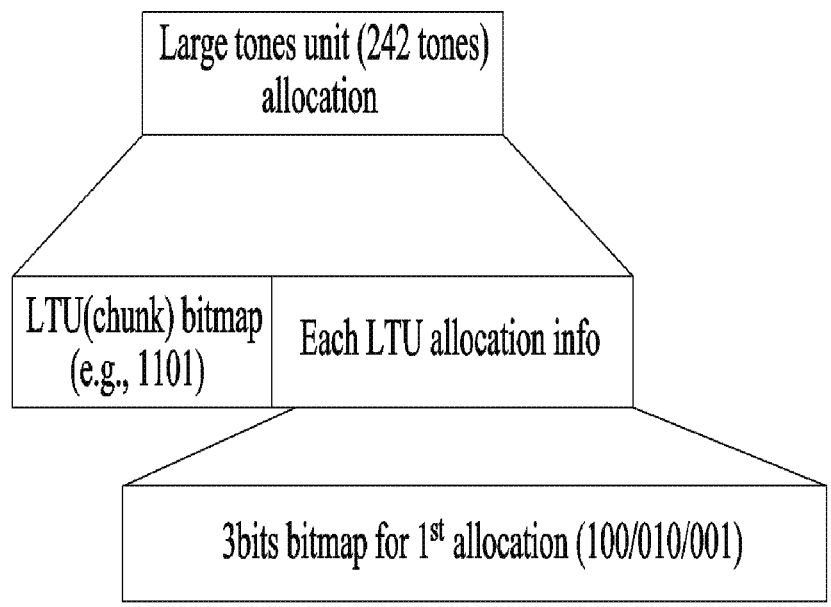

In this case, the 3-bit bitmap for the first allocation is set to one of 100/010/001, the first LTU allocation is allocated one LTU and is followed by two allocations having 1 LTU, the size information of which may not be included. This example is shown in FIG. 36.

Figure 37:
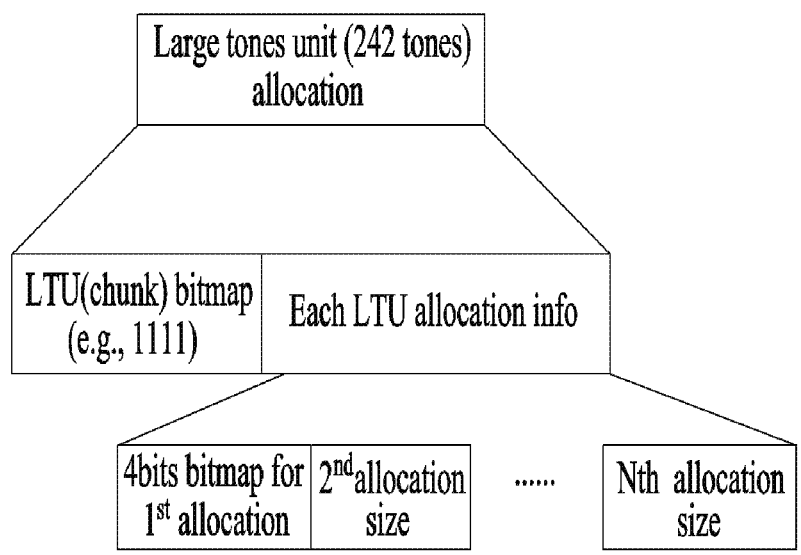

When the number of LTUs is 4 (LTU bitmap: 1111), the 4-bit bitmap may indicate allocation information of first allocation. The unit size may be indicated in second allocation and subsequent allocations thereof. This example is shown in FIG. 37.

The size of the second allocation and subsequent allocations thereof may be equal to or less than that of the first allocation. Accordingly, the size information of the second allocation and the subsequent allocations thereof may not be included.

Figure 38:
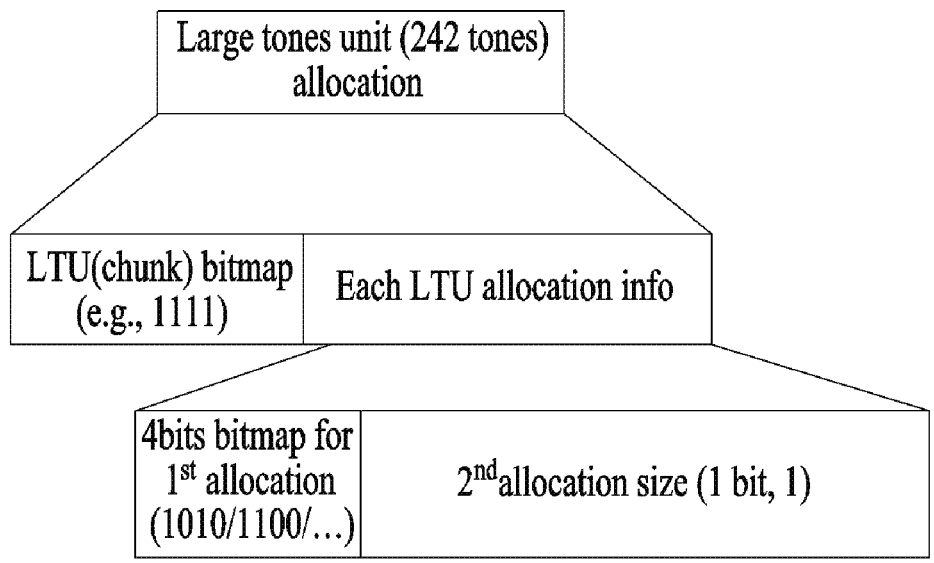

FIG. 38 shows an example in which first allocation is composed of 2 LTUs (242×2) and second allocation is composed of 2 LTUs (242×2). The size of the bit indicating a second allocation size is 1, a bit value 0 indicates 1 allocation and 1 indicates allocation of the remaining 2 LTUs.

Figure 39:
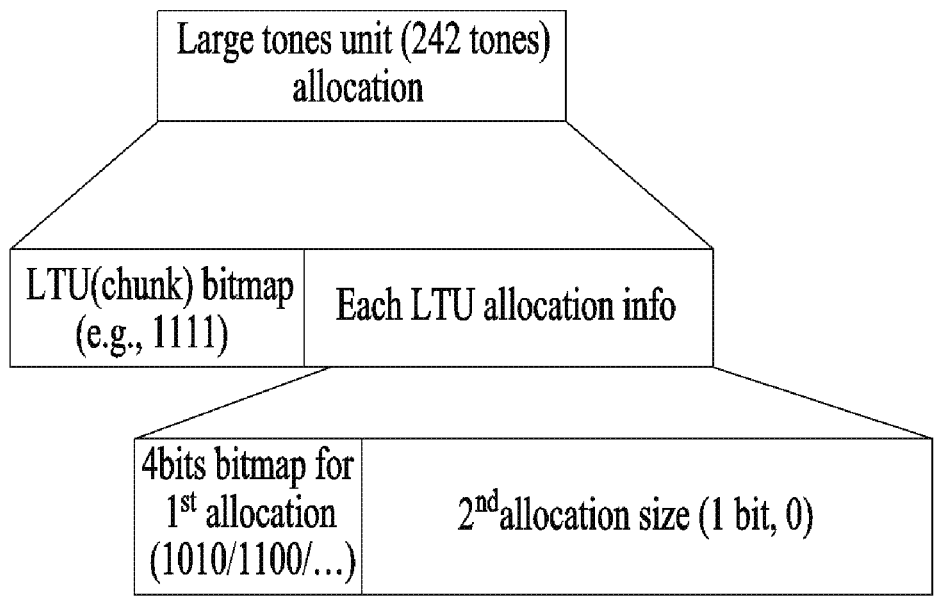

When the second allocation size is 0, since the second allocation size is 1 LTU, last LTU allocation is allocated 1 LTU. This example is shown in FIG. 39.

That is, 2 LTUs may be allocated to the first allocation and 1 LTU may be allocated to each of the second and third allocations.

Figure 40:
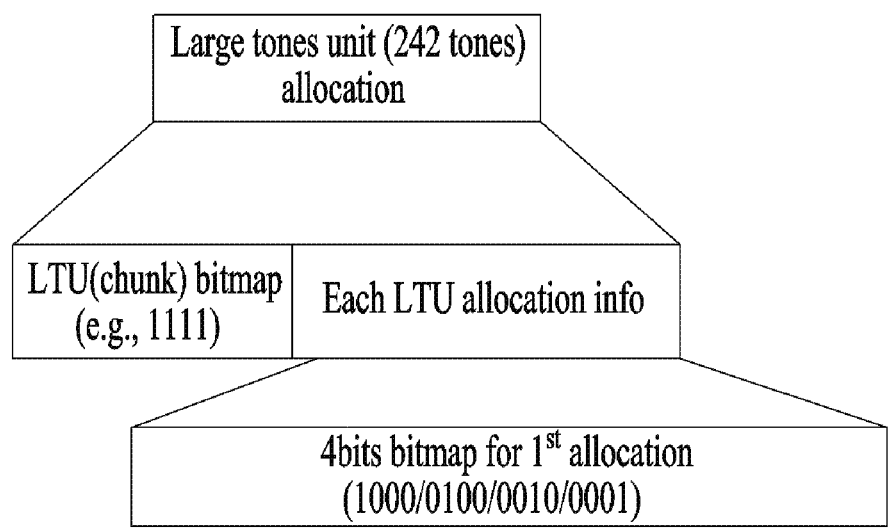

When the first allocation is allocated 1 LTU, the first allocation is automatically followed by three LTU allocations of 1 LTU. Accordingly, in this case, information on second LTU allocation does not need to be indicated. FIG. 40 shows an example in which first allocation is composed of 1 LTU.

Figure 41:
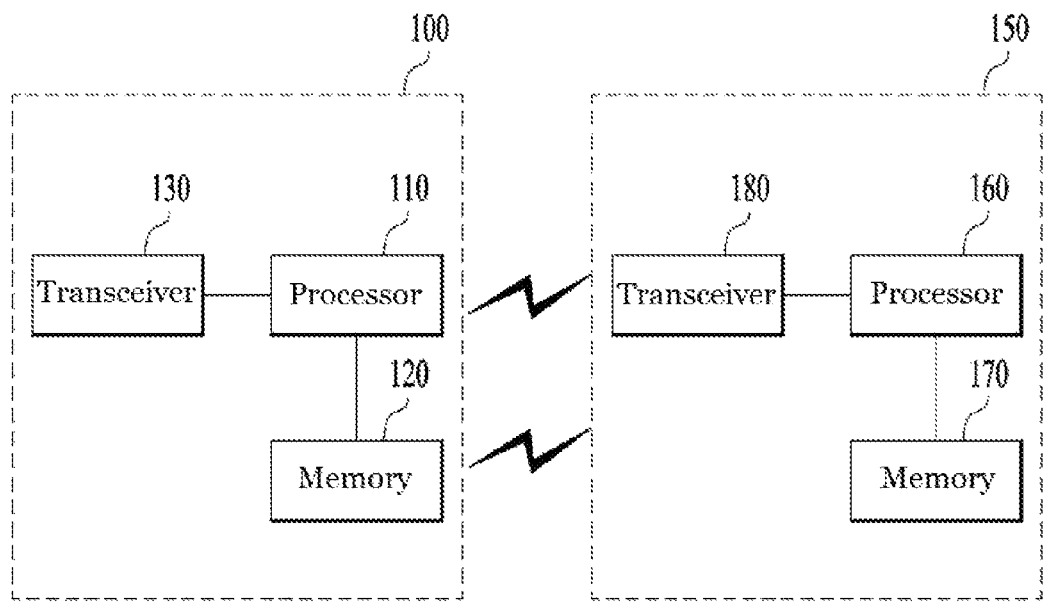
FIG. 41 is a diagram illustrating an apparatus for implementing the above-described method.

FIG. 41 is a diagram illustrating an apparatus for implementing the above-described method.

A wireless device 800 of FIG. 41 may correspond to a specific STA of the above description and a wireless device 850 may correspond to the AP of the above description.

The STA 800 may include a processor 810, a memory 820 and a transceiver 830 and the AP 850 may include a processor 860, a memory 870 and a transceiver 880. The transceivers 830 and 880 may transmit and receive a radio signal and may be executed at a physical layer of IEEE 802.11/3GPP. The processors 810 and 860 may be executed at the physical layer and/or MAC layer and are connected to the transceivers 830 and 880. The processors 810 and 860 may perform the above-described UL MU scheduling procedure.

The processors 810 and 860 and/or the transceivers 830 and 880 may include application-specific integrated circuits (ASICs), other chipsets, logic circuits and/or data processors. The memories 820 and 870 may include read-only memories (ROMs), random access memories (RAMs), flash memories, memory cards, storage media and/or other storage units. When one embodiment is implemented as software, the above-described method may be embodied as a module (e.g., process, function) for performing the above-described function. The module may be stored in the memories 820 and 870 and may be executed by the processors 810 and 860. The memories 820 and 870 may be disposed inside or outside the processors 810 and 860 and may be connected to the processors 810 and 860 by a well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although it is assumed that the present invention is applied to an IEEE 802.11 based wireless local area network (WLAN) system, the present invention is not limited thereto. The present invention is applicable to various wireless systems in which an AP may transmit a frame to a plurality of STAs in a wideband.

The invention claimed is:

1. A method for a station (STA) to receive a radio frame from an access point (AP) in a wireless local area network (WLAN) system, the method comprising:

receiving, at the STA, the radio frame including a signaling field and a data field, the signaling field including a first signaling field (SIG A field) including common control information and a second signaling field (SIG B field) including user specific control information, and the second signaling field further including data transmission resource allocation information; and processing, at the STA, the received radio frame, wherein, if the radio frame is received with a bandwidth of 80 MHz or 160 MHz, a first one of the data transmission resource allocation information received through a first 20 MHz band is independent from a second one of the data transmission resource allocation information received through a second 20 MHz band, the first 20 MHz band and the second 20 MHz band are two contiguous 20 MHz bands, wherein the second signaling field received through a specific 20 MHz band includes data transmission resource allocation information for the data field on the specific 20 MHz band, and wherein the second signaling field received through the specific 20 MHz band further includes data transmission resource allocation information for the data field on another 20 MHz band which is non-contiguous to the specific 20 MHz band, if the radio frame is received with the bandwidth of 80 MHz or 160 MHz.

2. The method according to claim 1, wherein the data transmission resource allocation information of the second signaling field received through the specific 20 MHz band is duplicated and received through the non-contiguous 20 MHz band.

3. The method according to claim 1, wherein the data transmission resource allocation information of the second signaling field received through the specific 20 MHz band indicates that a plurality of non-contiguous 20 MHz bands are allocated to a specific STA among the plurality of STAs.

4. The method according to claim 1, wherein the second signaling field includes first information indicating a common resource allocation structure for a plurality of STAs and second information indicating resource allocation information of each of the plurality of STAs.

5. The method according to claim 4, wherein the second information includes a field indicating an identity of each of the plurality of STAs and at least one per-STA resource allocation field indicating data transmission resource allocation information of an STA corresponding to the identity in the resource allocation structure.

6. The method according to claim 4, wherein the first information is in the form of a bitmap having a predetermined length, and
wherein a plurality of combinations represented by the bitmap comprises first resource unit combinations having a size of a multiple of 26 tones and a second resource unit combinations having a size of a multiple of 242 tones in the resource allocation structure.

7. A station (STA) apparatus for receiving a radio frame from an access point (AP) in a wireless local area network (WLAN) system, the STA comprising:
a transceiver configured to receive the radio frame including a signaling field and a data field, the signaling field including a first signaling field (SIG A field) including common control information and a second signaling field (SIG B field) including user specific control information, and the second signaling field further including data transmission resource allocation information; and
a processor configured to process the received radio frame,
wherein, if the radio frame is received with a bandwidth of 80 MHz or 160 MHz, a first one of the data transmission resource allocation information received through a first 20 MHz band is independent from a second one of the data transmission resource allocation information received through a second 20 MHz band, the first 20 MHz band and the second 20 MHz band are two contiguous 20 MHz bands,
wherein the second signaling field received through a specific 20 MHz band includes data transmission resource allocation information for the data field on the specific 20 MHz band, and
wherein the second signaling field received through the specific 20 MHz band further includes data transmission resource allocation information for the data field on another 20 MHz band which is non-contiguous to the specific 20 MHz band, if the radio frame is received with the bandwidth of 80 MHz or 160 MHz.

8. The STA according to claim 7, wherein the data transmission resource allocation information of the second signaling field received through the specific 20 MHz band is duplicated and received through the non-contiguous 20 MHz band.

9. The STA according to claim 7, wherein the processor uses the data transmission resource allocation information of the second signaling field received through the specific 20 MHz band to identify that a plurality of non-contiguous 20 MHz bands are allocated to a specific STA among the plurality of STAs.

10. The STA according to claim 7, wherein the second signaling field includes first information indicating a common resource allocation structure for a plurality of STAs and second information indicating resource allocation information of each of the plurality of STAs.

11. The STA according to claim 10, wherein the second information includes a field indicating an identity of each of the plurality of STAs and at least one per-STA resource allocation field indicating data transmission resource allocation information of an STA corresponding to the identity in the resource allocation structure.

12. The STA according to claim 10, wherein the first information is in the form of a bitmap having a predetermined length, and
wherein a plurality of combinations represented by the bitmap comprises a first resource unit combinations having a size of a multiple of 26 tones and a second resource unit combinations having a size of a multiple of 242 tones in the resource allocation structure.

* * * * *